(12) United States Patent
Improta et al.

(10) Patent No.: US 12,261,768 B2
(45) Date of Patent: *Mar. 25, 2025

(54) METHOD AND SYSTEM TO REDUCE A NUMBER OF BORDER GATEWAY PROTOCOL NEIGHBORS CROSSED TO REACH TARGET AUTONOMOUS SYSTEMS

(71) Applicant: Catchpoint Systems, Inc., Boston, MA (US)

(72) Inventors: Alessandro Improta, Massa (IT); Luca Sani, Lucca (IT); Dritan Suljoti, Parkland, FL (US); Sergey Katsev, Cortlandt Manor, NY (US)

(73) Assignee: Catchpoint Systems, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,303

(22) Filed: Mar. 9, 2023

(65) Prior Publication Data
US 2023/0300066 A1    Sep. 21, 2023

Related U.S. Application Data

(63) Continuation of application No. 17/243,248, filed on Apr. 28, 2021, now Pat. No. 11,627,073.
(Continued)

(51) Int. Cl.
*H04L 45/302*   (2022.01)
*H04L 45/122*   (2022.01)
*H04L 69/329*   (2022.01)

(52) U.S. Cl.
CPC .......... *H04L 45/306* (2013.01); *H04L 45/122* (2013.01); *H04L 69/329* (2013.01)

(58) Field of Classification Search
CPC ....... H04L 69/329; H04L 45/04; H04L 45/12; H04L 45/122
See application file for complete search history.

(56) References Cited

U.S. PATENT DOCUMENTS

| 11,627,073 B2 | 4/2023 | Improta et al. |
| 2003/0120769 A1 | 6/2003 | McCollom |

(Continued)

OTHER PUBLICATIONS

LINUX Foundation Collaborative Projects: FR Routing Project, Retrieved from Internet at: https://frrouting.org/, Retrieved from Internet on: Apr. 23, 2021, 3 pages.

(Continued)

*Primary Examiner* — Rasheed Gidado
(74) *Attorney, Agent, or Firm* — Hamilton, Brook, Smith & Reynolds, P.C.

(57) ABSTRACT

The disclosed method and system increase routing efficiency by identifying a set of candidate Autonomous Systems (ASes) able to reduce average AS distances towards a set of target ASes. Starting from a list of Routing Information Base (RIB) snapshots and a set of target ASes, candidate ASes are ranked based on the gain they would provide in terms of AS distance if they were connected to the network administrator AS. A set of starting ASes may represent the ASes to which the administrator is already connected, and a set of forbidden ASes may represent the ASes to which the administrator does not want to connect. An exemplary web-based interface may show gains of candidate ASes, allowing the administrator to better understand how much an average AS distance toward the set of target ASes would improve.

20 Claims, 19 Drawing Sheets

Related U.S. Application Data

(60) Provisional application No. 63/059,803, filed on Jul. 31, 2020.

(56) References Cited

U.S. PATENT DOCUMENTS

| | | | |
|---|---|---|---|
| 2010/0002712 | A1 | 1/2010 | Suzuki et al. |
| 2013/0132542 | A1* | 5/2013 | Zhang .................... H04L 45/04 709/223 |
| 2015/0172168 | A1* | 6/2015 | Picconi .................. H04L 45/64 709/241 |
| 2018/0077049 | A1 | 3/2018 | Paul et al. |
| 2021/0344594 | A1 | 11/2021 | Mendez et al. |
| 2022/0038366 | A1 | 2/2022 | Improta et al. |

OTHER PUBLICATIONS

Gregori, E. et al., "A Novel Methodology to Address the Internet AS-level Data Incompleteness," IEEE/ACM Transactions on Networking, vol. 23, Issue 4, 14 pages (Aug. 2015).

Gregori, E. et al., "Isolario: a Do-ut-des Approach to Improve the Appeal of BGP Route Collecting," arXiv.org:1611.06904v1, 10 pages (Nov. 2016).

Isolario Project: Interactive Collector Engine (ICE) and BGP Scanner, Retrieved from Internet at: https:/isolario.it/web_content/php/site_content/tools.php, Retrieved from Internet on: Apr. 23, 2021, 1 page.

Quagga Software Routing Suite, Retrieved from Internet at: https://www.quagga.net/, Retrieved from Internet on: Apr. 23, 2021, 1 page.

BGP Scanner, Retrieved from Internet at: https://gitlab.com/lsolario/bgpscanner/-/wikis/Home, Retrieved from Internet on: Apr. 28, 2021, 3 pages.

RIPE-NCC / bgpdump Utility and C Library for Parsing MRT Files, Retrieved from Internet at: https://github.com/RIPE-NCC/bgpdump, Retrieved from Internet on: Apr. 28, 2021, 2 pages.

Di Battista, et al., "Computing the Types of the Relationships between Autonomous Systems," Submission To IEEE/ACM Transactions On Networking, pp. 1-14 (2003).

Dimitropoulos, X., et al., "Inferring AS Relationships: Dead End or Lively Beginning?," In: Nikoletseas S.E. (eds) Experimental and Efficient Algorithms. WEA Lecture Notes in Computer Science, vol. 3503 (2005).

Hu, H. et al., "A Novel Method for Router-to-AS Mapping Based on Graph Community Discovery," www.mdpi.com/journal/information, vol. 10, No. 87 (2019).

Leiner, B. M., "A Brief History of the Internet," ACM SIGCOMM Computer Communication Review, vol. 39, No. 5, (Oct. 2009).

Fall 2019 ELEN6774 Topics in Networking: Internet Measurement: Retrievable at : http://www.columbia.edu/~ebk2141/teaching/InternetMeasurement/2019FA, 7 pages (2019).

Gao, "On Inferring Autonomous System Relationships in the Internet," IEEE/ACM Transactions on Networking, vol. 9, Issue 6, pp. 733-745; Dec. 2001.

Extended European Search Report for European Application No. 21188950.6, titled: Method And System To Identify A List Of Potential Border Gateway, Dated: Dec. 20, 2021.

Edman, M. and P. Syverson, "AS-awareness in Tor Path Selection," Computer and Communications Security, ACM, 2 Penn Plaza, Suite 701, New York, NY 10121-0701 USA, Nov. 9, 2009, pp. 380-389.

Smith, J.M. and M. Schuchard, "Routing Around Congestion: Defeating DDOS Attacks and Adverse Network Conditions via Reactive BGP Routing," 2018 IEEE Symposium on Security and Privacy (SP), IEEE, May 20, 2018, pp. 599-617.

Non-Final Office Action for U.S. Appl. No. 17/243,248, entitled, "Method And System To Reduce A Number Of Border Gateway Protocol Neighbors Crossed To Reach Target Autonomous Systems," dated Sep. 23, 2022.

Notice of Allowance for U.S. Appl. No. 17/243,248, entitled, "Method And System To Reduce A Number Of Border Gateway Protocol Neighbors Crossed To Reach Target Autonomous Systems," dated Dec. 16, 2022.

* cited by examiner

```
p2c_matrix = {}
for every ASₓ in topology ~ 300
    distance = 1
    found = {}
    to_compute = {ASₓ}
    next_round = {}
    for each AS_y in to_compute ~ 301
        if AS_y in found ~ 302
            skip
        remove AS_y from to_compute ~ 303
        p2c_matrix[ASₓ][AS_y] = distance
        insert AS_y in found
        insert every AS_z customer or sibling of AS_y in next_round
        remove AS_y from to_compute
    if to_compute is empty
        swap next_round and AS_to_compute ~ 304
        distance++ ~ 305
```

FIG. 3

```
matrix = {}
for every AS_x in topology ~ 400
    distance = 1
    found = {}
    to_compute = {AS_x}
    next_round = {}
    for each AS_y in to_compute ~ 401
        if AS_y in found ~ 402
            remove AS_y from to_compute
            skip
        if matrix[AS_x][AS_y].overall is set && matrix[AS_x][AS_y].overall >distance
            matrix[AS_x][AS_y].overall = distance ~ 403
        for each d_r in p2c_ matrix[AS_x][AS_r] not blank
            if matrix[AS_x][AS_r].overall is not set || matrix[AS_x][AS_r].overall > d_r + distance
                matrix[AS_x][AS_r].overall = d_r + distance ~ 404
            if matrix[AS_x][AS_r].downhill is not set || matrix[AS_x][AS_r].downhill > d_r + distance
                matrix[AS_x][AS_r].downhill = d_r + distance ~ 405
        insert AS_y in found
        remove AS_y from to_compute
        insert every AS_z provider or sibling of AS_y in next_round
    if to_compute is empty
        swap next_round and AS_to_compute ~ 406
        distance++ ~ 407
```

FIG. 4

METHOD AND SYSTEM TO REDUCE A NUMBER OF BORDER GATEWAY PROTOCOL NEIGHBORS CROSSED TO REACH TARGET AUTONOMOUS SYSTEMS

RELATED APPLICATIONS

This application is a continuation of U.S. application Ser. No. 17/243,248, filed on Apr. 28, 2021, now U.S. Pat. No. 11,627,073, issued Apr. 11, 2023, which claims the benefit of U.S. Provisional Application No. 63/059,803, filed on Jul. 31, 2020. The entire teachings of the above applications are incorporated herein by reference.

BACKGROUND

Most historians date the birth of the commercial Internet to the late 1980s or early 1990s [Leiner et al.]. Since then, the Internet has grown tremendously and has changed dramatically in its structure. In the early 1990s the Internet was composed of just a few hundred different Autonomous Systems (ASes) inter-connected on a customer-provider basis, while nowadays there are more than 70,000 different ASes actively announcing routing data to each other with an increasing number of settlement-free connections.

Since the early days of the Internet, the Border Gateway Protocol (BGP) played a key role in sustaining this growth, and is still recognized, in its current version (4, RFC 4271), as the de-facto standard inter-domain routing protocol used by ASes to exchange routing information. Especially important characteristics of BGP include simplicity and flexibility. BGP allows network administrators to implement extremely variegated import/export policies to reflect traffic engineering decisions or economic agreements between BGP neighbor ASes. Because of these policies, an AS announces to each of its neighbors a different set of routes potentially tagged with different path attributes and containing all the information required to route packets via itself towards a list of destinations included in the packet.

Among the path attributes announced by each peer AS, the AS_PATH plays a key role. The AS_PATH is a well-known mandatory path attribute conceived in BGP to allow routers to recognize routing loops and discard packets. This path attribute is created every time an AS decides to make one of its new networks reachable from the rest of the Internet, and the attribute originally contains only the AS originating the network. The related BGP packet is then announced to each of its BGP neighbors, which will then learn about the existence of this new network which is reachable via direct connection to the originating AS. Then, each of the BGP neighbors prepends their own AS number to the original AS_PATH content and propagates the new BGP packet towards their own BGP neighbors, and so forth. Whenever an AS has already learned how to route traffic towards a new destination from one of its peers and another peer announces a route towards the same destination, the router performs a BGP decision process to determine whether or not to install that route in the RIB and then propagate that information to its neighbors, as per RFC 4271.

At steady state, a BGP border router has received a collection of routes from each of its BGP neighbors and has sent no more than one route per destination to each of its BGP neighbors. The sizes of route collections received by the BGP border router from each BGP neighbor may differ significantly depending on import policies set on the BGP border router and on export policies set on each BGP neighbor. Similarly, the number of routes announced to each BGP neighbor depends on the BGP border router export policies.

Import and export policies set on BGP border routers belonging to different ASes typically reflect an economic relationship established between the two parties. As described in [Gao], most of these economic relationships can be grouped in three main families: customer-provider (c2p or p2c), peer-to-peer (p2p) and sibling-to-sibling (s2s). In a customer-provider relationship the customer announces to the provider only its own networks and the networks received from its customers, while the provider announces to the customer every network learned from its BGP neighbors to provide the customer a full Internet reachability. In a peer-to-peer relationship each of the two parties announces to the other its own networks and the networks received from its customers with an aim of lowering the latency between the involved networks, keeping the traffic local and bypassing the respective providers. In a sibling-to-sibling relationship each of the two ASes provide transit to the other to reach all the Internet destinations. This latter relationship is usually applied between ASes belonging to the very same organization.

Each router thus has access to some topological information about the Internet structure thanks to the AS_PATH attributes stored in its RIB and Adj-RIB-Ins, and network administrators can analyze these entries to improve their routing.

SUMMARY

The topological information, provided by the AS_PATH attributes stored in the RIB and Adj-RIB-Ins of each router, is extremely biased and incomplete due to the way the AS_PATH attribute is built. First, each AS (and potentially each BGP router of the AS) has its own peculiar view of the Internet depending on its role in the Internet hierarchy and on the number of its providers and peers. Second, each router can only see at maximum one single route from each BGP neighbor, thus ignoring the existence of a plethora of other feasible routes and their related AS_PATHs. As a result, the Internet topology that a router can create by analyzing the AS_PATH of the routes in its Adj-RIB-Ins is extremely limited and incomplete.

Sources of information that can be utilized to help to partially fill this gap are represented by public BGP route collectors deployed by the University of Oregon (Route Views project), by RIPE NCC (Routing Information Service—RIS) and by IIT-CNR (Isolario project). For example, route collectors may be considered simple servers that act as border routers and establish BGP sessions with numerous organizations on a voluntarily basis. Such route collectors may behave like one of two ends of a logical connection, but they usually only collect incoming BGP messages without announcing any route back to the other party, to avoid interfering with the peer routing. Data collected is then stored in Multi-threaded Routing Toolkit (MRT) export format (RFC 6396) and made publicly available as RIB snapshots and collections of update messages on the website of each route collector.

Despite their undeniable value to reveal the inter-AS infrastructure of the Internet, route collectors are still not able to fill the information gap, as proved in [Gregori et al.]. Route Views, RIS and Isolario altogether establish BGP sessions with hundreds of ASes, whilst the Internet is nowadays composed of dozens of thousands of ASes. The remaining information gap limits the quality of the resulting inferences of any analysis based on data collected.

The methods and systems disclosed herein increase routing efficiency by identifying a set of candidate ASes and determining respective impacts of connecting the candidate ASes between given network administrator ASes and a defined set of target ASes. The candidate ASes identified may be service providers and/or peers.

Connecting respective candidate ASes, according to the indicated impacts, may reduce an average number of hops between given network administrator ASes and target ASes. In this way, routing efficiency may be improved.

Many advantages may be provided by the disclosed methods and systems. For example, it may be desirable to route packets through, or at least close to, specific ASes of interest. Some examples of ASes of interest may be ASes hosted within a given country, ASes of an initial provider choice for an Internet company just starting their business, or ASes of a provider chosen to improve connectivity towards a set of intermediate or destination ASes.

In one embodiment, a computer-implemented method of increasing routing efficiency between one or more given ASes and respective sets of target ASes in a BGP session includes receiving, at a processor, a set of RIBs indicated by a user. The method further includes configuring the processor to parse the RIBs by extracting respective sets of routing attributes from the RIBs. The method further includes configuring the processor to identify a set of intermediate ASes from within the respective sets of routing attributes. The method further includes configuring the processor to infer economic relationships between pairs of adjacent intermediate ASes. The method further includes configuring the processor to calculate distances between intermediate ASes. The method further includes configuring the processor to infer candidate ASes from the set of intermediate ASes. The method further includes configuring the processor to calculate impacts of the candidate ASes on paths defined between given ASes and target ASes. The calculation of impacts is based on the calculated distances. The method further includes configuring the processor to output results, including the calculated impacts, to the user to identify candidate ASes to connect along the paths to reduce an average number of hops along the paths, thereby increasing routing efficiency between the given ASes and the target ASes.

The RIBs may utilize an MRT format or a text-based format. The method may further include receiving a list of starting ASes that are already connected to the paths. The method may further include receiving a list of ASes to avoid. The ASes to avoid may be referred to as forbidden ASes. The given ASes may be the starting ASes. The routing attributes may include an AS_PATH attribute. The economic relationships may include at least one of customer-provider (c2p or p2c), peer-to-peer (p2p), or sibling-to-sibling (s2s). The method may further include configuring the processor to create a topology of intermediate ASes with economic relationships between intermediate ASes tagged as p2c, c2p, p2p, or s2s. The calculated distances between intermediate ASes may include components of downhill distances calculated for edges tagged as p2c or s2s, and components of overall distances calculated for edges tagged as p2c, c2p, p2p, or s2s.

Candidate ASes may be inferred from the set of intermediate ASes by determining whether or not intermediate ASes are able to be connected to the paths. The impacts of the candidate ASes on the paths may be calculated by a gain analyzer. The gain analyzer may provide impacts for a list of candidate ASes. The list of candidate ASes may be ranked by impact. The list of candidate ASes ranked by impact may be output via a user interface. The user interface may also show an average distance for a candidate AS selected from the ranked list by the user. The list of candidate ASes ranked by impact may be output to a text-based computer file and stored in memory.

The method may further include receiving, at the processor, a selection from the user of at least one candidate AS to connect along the path, and the processor may consider the selected candidate AS to be connected along the path. The method may further include configuring the processor to parse the RIBs by extracting respective sets of routing attributes from the RIBs. The method may further include configuring the processor to identify intermediate ASes from within the respective sets of routing attributes. The method may further include configuring the processor to infer economic relationships between pairs of adjacent intermediate ASes. The method may further include configuring the processor to calculate, or load from memory, distances between intermediate ASes. The method may further include configuring the processor to infer candidate ASes from the set of intermediate ASes. The method may further include configuring the processor to calculate impacts of the candidate ASes on paths defined between given ASes and target ASes. The calculation of impacts may be based on the calculated distances. The method may further include configuring the processor to output results, including the calculated impacts, to the user to identify candidate ASes to connect along the paths to reduce an average number of hops along the paths, thereby increasing routing efficiency between the given ASes and the target ASes.

In another embodiment, a system for increasing routing efficiency between one or more given ASes and respective sets of target ASes in a BGP session includes a set of RIBs indicated by a user. The system further includes a processor and a non-transitory memory device having processor instructions stored thereon, the instructions, when loaded, configuring the processor to receive the set of RIBs directly via a user input or by loading the set of RIBs from the memory device. The processor is further configured to parse the RIBs by extracting respective sets of routing attributes from the RIBs. The processor is further configured to identify intermediate ASes from within the respective sets of routing attributes. The processor is further configured to infer economic relationships between pairs of adjacent intermediate ASes. The processor is further configured to calculate distances between intermediate ASes. The processor is further configured to infer candidate ASes from the set of intermediate ASes. The processor is further configured to calculate impacts of the candidate ASes on paths defined between given ASes and target ASes. The calculation of impacts is based on the calculated distances. The processor is further configured to output results, including the calculated impacts, to the user to identify candidate ASes to connect along the paths to reduce an average number of hops along the paths, thereby increasing routing efficiency between the given ASes and the target ASes. This embodiment may further optionally include any features described herein in connection with any of the other embodiments described herein.

In another embodiment, a user may provide, as an input toward a computer program, a list of RIB snapshots (either in MRT or text format), a set of target ASes, and optionally a list of ASes to avoid. A user may be a network administrator. RIB snapshots may be collected using any BGP data repository available, such as Route Views, RIS, Isolario and/or any private route collector. Richer initial datasets encourage more reliable results due to the intrinsic incompleteness of BGP data collected [Gregori et al.]. The list of ASes to avoid may be useful to list all the ASes that refuse to establish a commercial agreement or are too expensive to be connected.

The computer program may calculate a list of candidate ASes sorted by their impact. The impact of each AS may herein also be referred to as gain. The resulting list of candidate ASes may be provided to the user either in a text file or via graphical representation. In this latter case, the user may interactively query the computer program to select some candidate ASes and let the computer program run another iteration considering the chosen AS to be connected and considering the gains in terms of AS distances provided, if needed.

The computer program may run when one of the ASes listed in a prior run agrees to establish a BGP session to achieve a better result. In this sense, the network administrator may provide among the input list a RIB snapshot of the newly established BGP session to improve the quality of the result. Since the method provided is an inference, the individual AS chosen to be connected could indeed result in either an increased or decreased number of hops between given ASes and target ASes, and that may in turn affect the result of the following round of inferences. However, multiple rounds of inferences may result in a decreased average number of hops between given ASes and target ASes, thereby improving routing efficiency between given ASes and target ASes.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 illustrates pseudocode to retrieve a matrix of downhill AS distances computed using only p2c and s2s edges.

FIG. 4 illustrates pseudocode to retrieve a matrix of overall AS distances from a matrix of downhill AS distances computed using only p2c and s2s edges and an economic topology.

DETAILED DESCRIPTION

A description of example embodiments follows.

Figure 1:
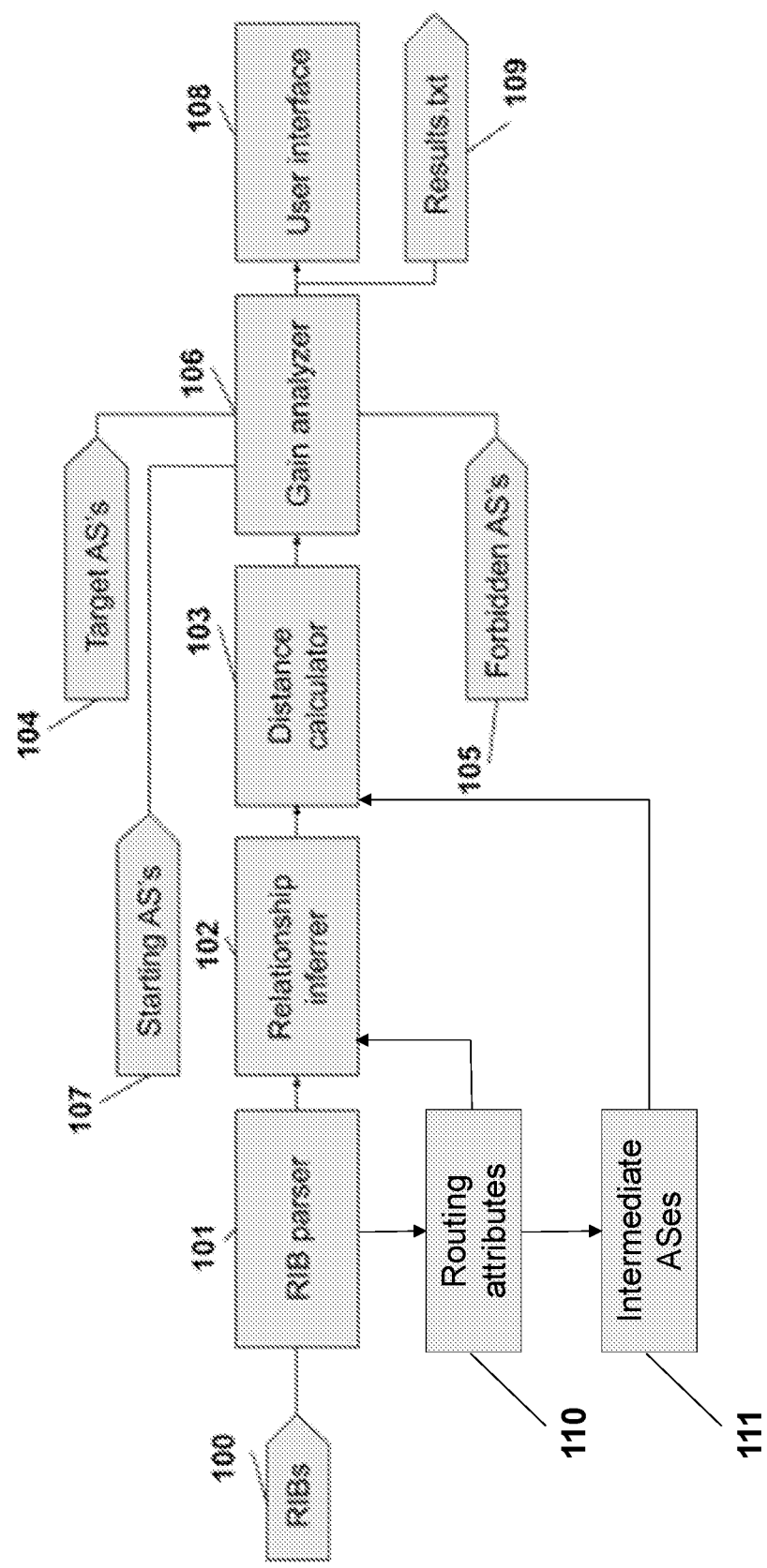
FIG. 1 illustrates a schematic block diagram of a system for obtaining a list of candidate ASes to be connected along paths defined between given ASes and target ASes in order to reduce an average number of hops made by packets traveling along the paths.

An example embodiment of the invention is depicted in FIG. 1. A set of RIBs 100 is selected by a user and taken as input by a RIB parser 101. The RIB parser 101 is configured to parse routing data and extract, from a computer file having an MRT or text-based format, a list of routing attributes 110 found in each RIB. The routing attributes 110 may be AS_PATH attributes. A set of intermediate ASes 111, referred to within the listed routing attributes 110, is thus identified. A relationship inferrer 102 is configured to use the routing attributes 110 parsed to infer a set of economic relationships between each pair of adjacent intermediate ASes 111 referred to within the listed routing attributes 110. The economic relationships are then used by a distance calculator 103, which is configured to calculate distances between each intermediate AS 111 referred to within the listed routing attributes 110, respecting the valley-free property described in [Gao]. The distances computed are then used by a gain analyzer 106, which is configured to infer, from the set of intermediate ASes 111, candidate ASes that are able to be connected to paths defined between given ASes and respective sets of target ASes. The gain analyzer 106 is further configured to determine respective gains that candidate ASes would provide if connected along the paths, optionally excluding a list of forbidden ASes 105. The gain analyzer 106 also takes into consideration a list of starting ASes 107, which includes all the ASes already connected to the user router(s). The terms AS and router may herein be used interchangeably. The gains are then provided to the user via a user interface 108 or in a textual file 109, enabling candidate ASes to be connected along the paths to reduce an average number of hops along the paths, thereby increasing routing efficiency between the given ASes and the target ASes.

The list of target ASes 104, provided by the user as an input to the gain analyzer 106, may be created in many ways depending on objectives of the user. For example, one possible list may include all the ASes geolocated in a specific country of interest. The list of target ASes 104 is used by the gain analyzer 106 to calculate the gains of each AS. Target ASes may be herein interchangeably referred to as destinations or destination ASes.

The list of forbidden ASes 105, provided by the user as an input to the gain analyzer 106, contains a list of ASes for the gain analyzer 106 to avoid considering in its computations. This can be particularly useful whenever the network administrator a priori knows that he/she does not want to or cannot connect that AS, for any reason.

The list of starting ASes 107, provided by the user as an input to the gain analyzer 106, contains a list of ASes that are already BGP neighbors of the AS of the network administrator. This list is used as a starting point by the gain analyzer 106 and may contain the AS of the network administrator.

RIB Parser

The list of RIBs 100, provided by the user as an input file to the RIB parser 101, may be either in textual format or in MRT format (RFC 6396). In both cases, entries of the list of RIBs 100 contain a routing attribute 110 that can be used in computations run by the RIB parser 101. These entries are provided by default in MRT files provided by public route collectors such as University of Oregon Route Views project, RIPE NCC Routing Information Service (RIS) and IIT-CNR Isolario project. The user may create his/her own MRT RIB snapshot files feeding a software BGP routing daemon such as Quagga, FRRouting or Isolario Interactive Collector Engine (ICE), or the user may create his/her own textual format by querying his/her router with the Cisco equivalent command "show ip bgp". If needed by the implementation of the RIB parser 101, MRT files may be translated into a set of textual routing attributes by using any of the MRT tools or libraries that are publicly available, such as bgpscanner or bgpdump.

The RIB parser 101 extracts from input data a list of routing attributes 110. If the input is in MRT format, the list may be created by reading the BGP attributes contained in each TABLE_DUMPV2 record of the file and extracting the related routing attribute 110. If the input is in text format, the list may be created by extracting the column related to the routing attribute 110.

Relationship Inferrer

Figure 9:
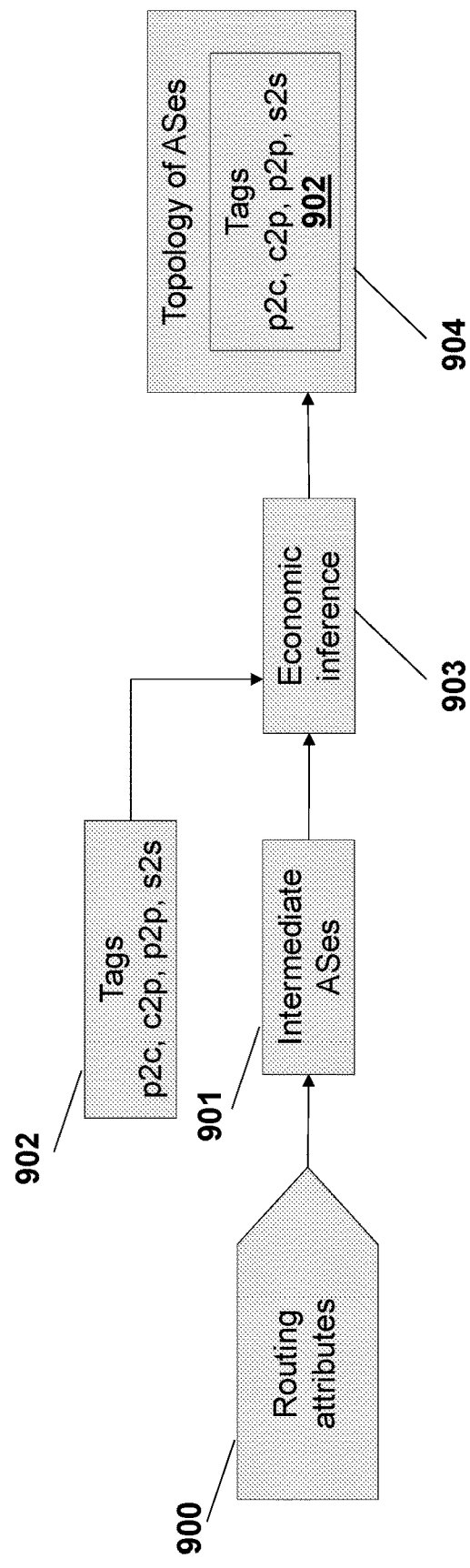
FIG. 9 illustrates a schematic block diagram of a system for creating a topology of intermediate ASes.

An embodiment of the relationship inferrer 102 is described in FIG. 9. The relationship inferrer 102 analyzes each of the collected routing attributes 110-900 and applies a tag 902 on each pair of adjacent intermediate ASes 111-901 reflecting a type of relationship inferred between those ASes 111-901. There are several different economic inference 903 algorithms described in literature (e.g. [Di Battista et al., Dimitropoulos et al.]), and the relationship inferrer 102 may be configured to use any of them. The relationship inferrer 102 may then create a topology 904 of intermediate ASes 111-901 able to be connected, with relationships tagged 902 as p2c, c2p, p2p or s2s.

Distance Calculator

Figure 2:
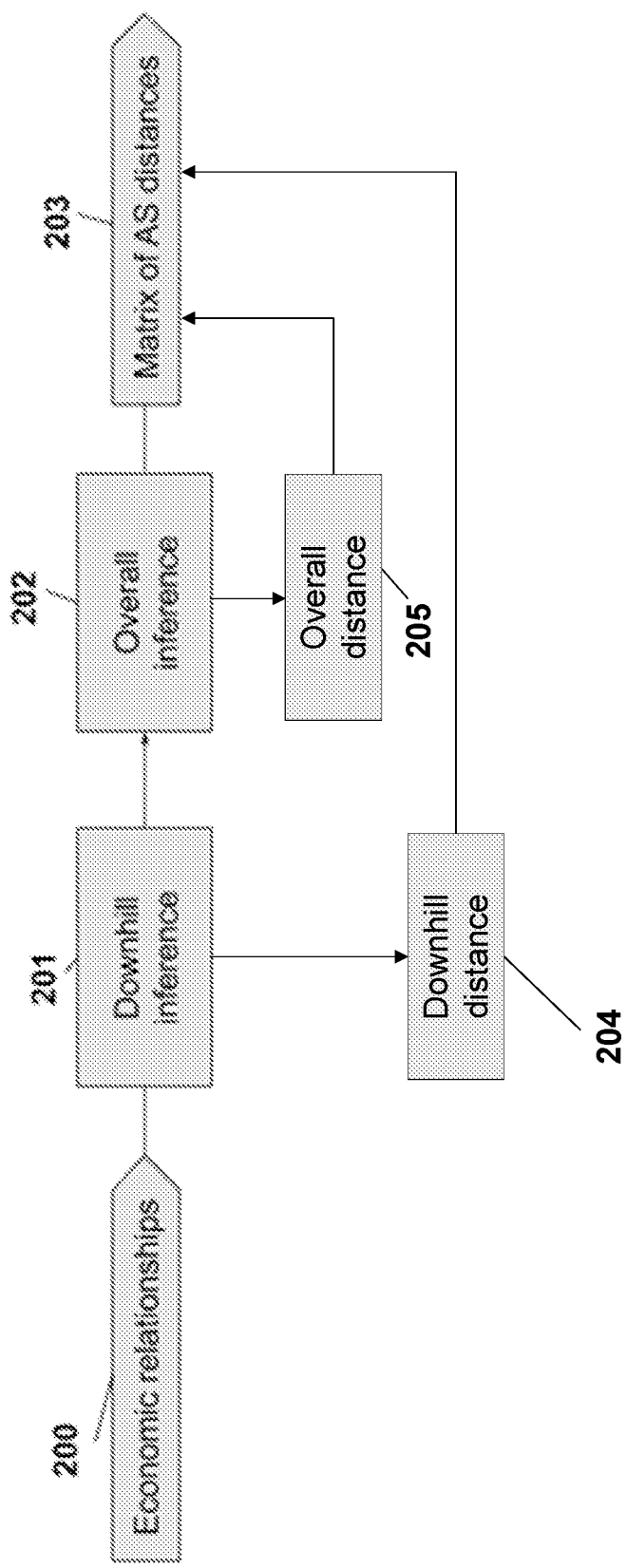
FIG. 2 illustrates a schematic block diagram of a system for obtaining a matrix of AS distances given an economic topology.

An embodiment of the distance calculator 103 is described in FIG. 2. It uses an economic topology created from the economic relationships 200 by the relationship inferrer 102 to detect the minimum number of AS hops required to reach from each AS to all other ASes on the Internet. To do that, the distance calculator 103 exploits the valley-free property described in [Gao], which can be summarized as follows: 1) a p2c edge can only be followed by another p2c edge or an s2s edge, 2) a p2p edge can only be followed by another p2c edge or an s2s edge, 3) a c2p edge can be followed by any type of edge, and 4) an s2s edge can be followed by any type of edge.

The distance calculator 103 may begin by configuring a downhill distance inferrer to perform a downhill inference 201 to create an M×M matrix of AS distances computed by crossing only p2c and s2s edges, where M is a number of ASes found in at least one of the routing attributes 110 in the RIBs 100.

One possible implementation of a downhill distance inferrer is described in the pseudocode depicted in FIG. 3. For every AS found in the economic topology 300, the downhill distance inferrer navigates a graph of the topology previously created by the relationship inferrer 102 and tagged with economic relationships, respecting the valley-free rules of [Gao]. From the graph, the downhill distance inferrer computes the distance found using only customer and sibling edges, hereinafter referred to as downhill distance 204. For each AS 301, the downhill distance inferrer records 303 the downhill distance 204 found. To avoid duplicate computations, the downhill distance inferrer skips the navigation of the graph if the considered AS has already been found 302. A distance variable is then incremented 305 once every AS has been analyzed, and the computation moves to analyze customer and sibling ASes of the ASes that have just been analyzed 304. It should be noted that performance of a downhill inference 201 leaves many matrix entries blank on purpose. Each of the blank entries in the matrix means that it is not possible to reach from one AS to the other via only p2c edges.

An overall distance inferrer then exploits the results of the downhill distance inferrer to perform an overall inference 202, thus creating an M×M matrix of AS distances 203 computed by crossing any edge of the graph. Each element of the resulting matrix 203 includes overall distance 205 and downhill distance 204 components.

One possible implementation of an overall distance inferrer is described in the pseudocode depicted in FIG. 4. For every AS found in the economic topology 400, the overall distance inferrer navigates the economic graph and computes the distance found using any edge of the graph, herein also referred to as overall distance 205. For each AS 401 the overall distance inferrer records 403 the overall distance 205 found. To avoid duplicate computations, the overall distance inferrer skips the navigation of the graph if the given AS has already been found 402. Then, the overall distance inferrer exploits the results provided by the downhill distance inferrer to fill gaps in the matrix 203 for ASes still to be computed 404-405. A distance variable is then incremented 406 once every AS has been analyzed, and the computation moves to analyze provider and sibling ASes of the ASes that have just been analyzed 407. The resulting matrix 203 is an M×M matrix wherein each element includes overall distance 205 and downhill distance 204 components.

Gain Analyzer

Figure 5:
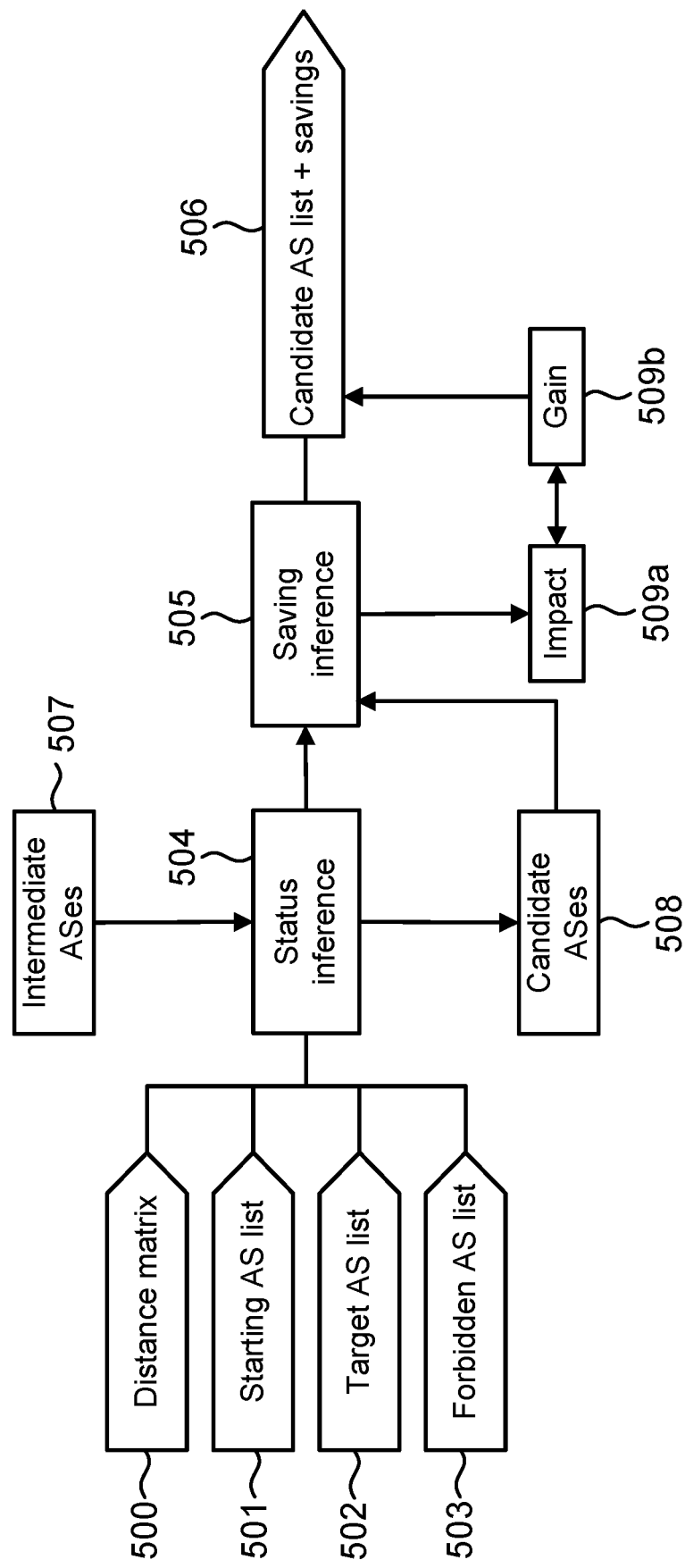
FIG. 5 illustrates a schematic block diagram of a system for inferring a list of candidate ASes sorted by their potential impact on paths defined between given ASes and target ASes if connected along the paths, given an AS distance matrix, a starting AS list and a target AS list.

An embodiment of the gain analyzer 106 is depicted in FIG. 5. The gain analyzer 106 uses the AS distances 500 computed by the distance calculator 103 to compute, for each respective AS described in the distance matrix 500, a list of potential saved hops to reach every target AS 104-502 if the respective AS were connected along paths defined between a given AS and the target ASes 104-502. The given AS may be the network administrator or user AS.

The gain analyzer 106 may begin by configuring a status inferrer to perform a status inference 504 by computing distances of each target AS 104-502 from the given AS using the starting AS list 107-501 and the distance matrix 500. If any AS is determined by the status inference 504 as being unable to be connected, its distance is set as the highest value found among other ASes plus 1. If the starting AS list 501 only includes ASes currently not able to be connected, every distance is set to 255. ASes listed in the list of forbidden ASes 503 will not be considered during the computation of the status inference 504, which may be useful when the network administrator is about to select its very first provider. ASes determined by the status inference 504 as being able to be connected, and not present in the list of forbidden ASes 503, may be referred to as candidate ASes 508 or as potential BGP neighbors.

The gain analyzer 106 then configures a savings inferrer to perform a saving inference 505 by computing, for respective candidate ASes 508, potential impacts 509*a* on paths defined between given ASes and target ASes 104-502 if the respective candidate ASes are connected along the paths, and constructing a list of candidate ASes 508 sorted by impact 509*a*. Impact 509*a* may herein also be referred to as gain 509*b*. ASes having higher values for gain 509*b* may be more likely to contribute to an average overall reduction in the number of AS hops required to reach any of the ASes in the target list 104-502. The list of candidate ASes 508 and corresponding gains 506 are then provided to the user, enabling candidate ASes 508 to be connected along the paths to reduce an average number of hops along the paths, thereby increasing routing efficiency between the given ASes and the target ASes 104-502.

User Interface

Figure 6A:
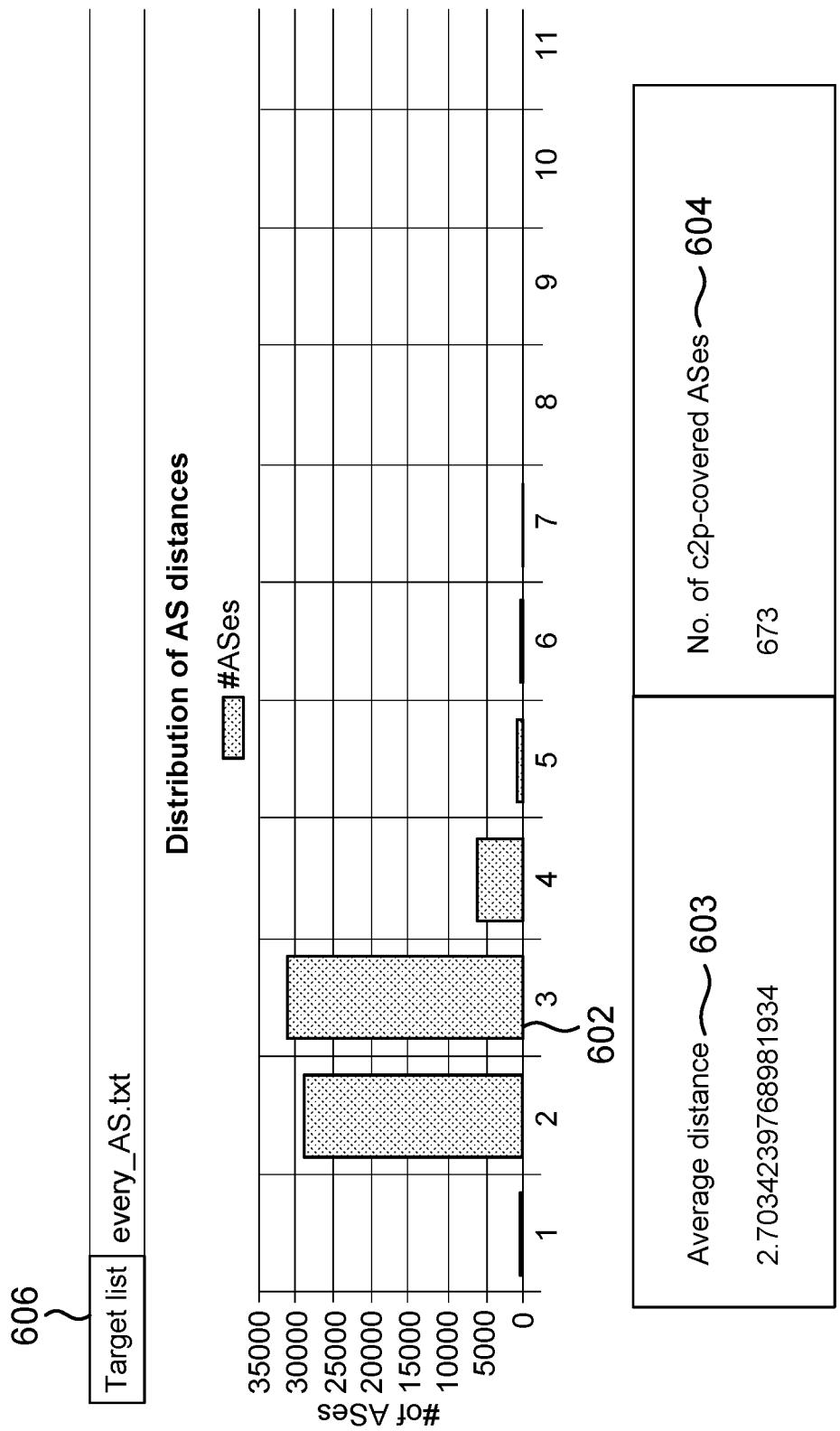
FIG. 6a illustrates a portion of an exemplary user interface for the method proposed.
Figure 6B:
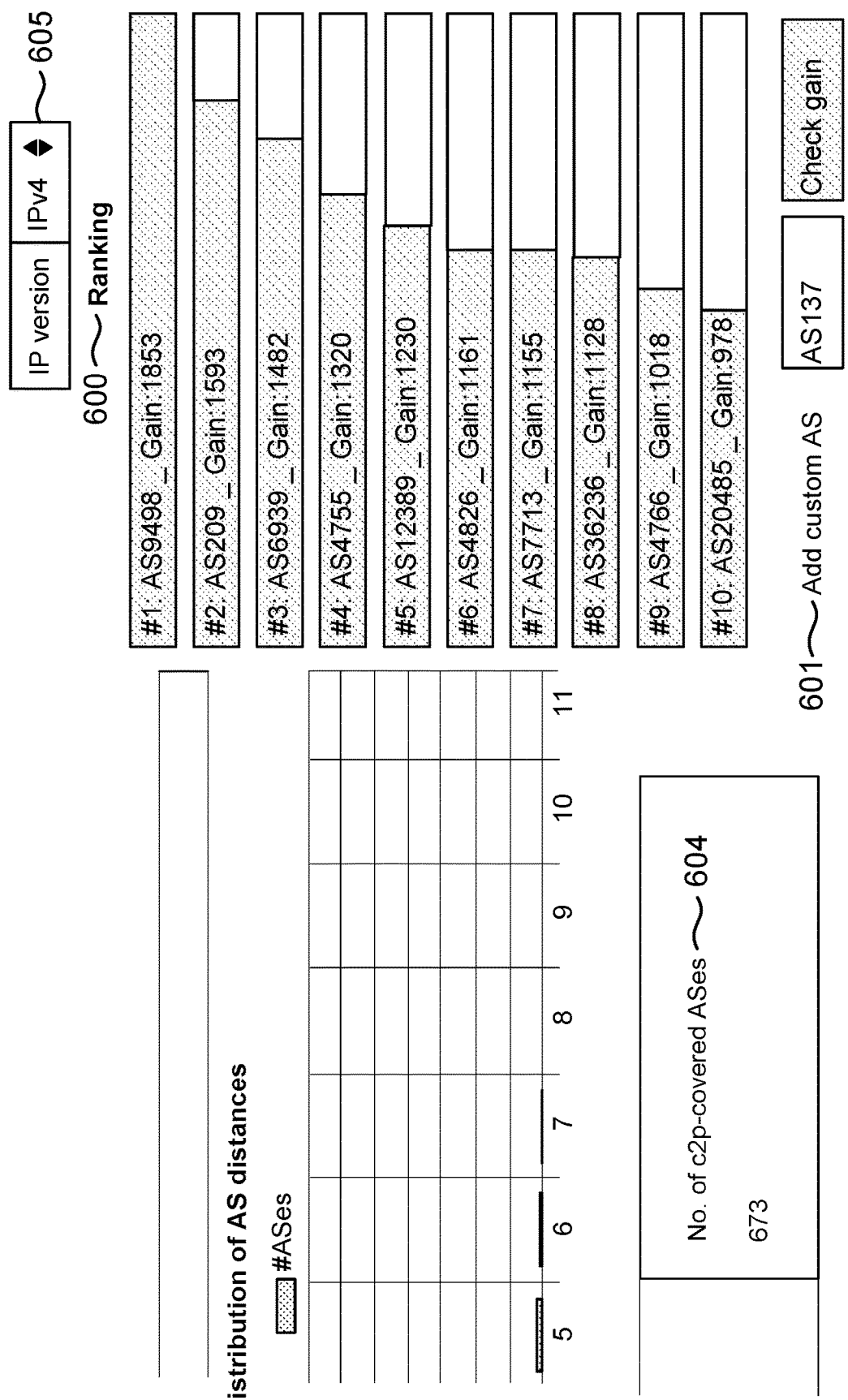
FIG. 6b illustrates a further portion of the exemplary user interface of FIG. 6a for the method proposed.

The user interface 108 may graphically provide the sorted results 506 to the user. FIGS. 6a-6b show an exemplary user interface. A list of candidate ASes 508 with high gains 509b-600 is shown on the right side of the interface 108. In the example shown, the ten candidate ASes 508 with the highest gains 509b-600 are listed with their respective AS numbers and calculated gains 509b-600. Panel 601 enables the user to retrieve gains 509b-600 of any candidate AS 508 of his/her choice. A distance distribution 602, together with an indication of average distance 603, enables the user to understand the current distance of his/her local AS from every other AS. A c2p-distance panel 604 enables the user to understand the number of ASes that can be reached using only c2p edges. This latter metric is particularly useful for measurement platforms, since it provides an idea of how many Internet AS edges can be revealed from the starting list of ASes, as described in [Gregori et al.]. The user can switch the analysis from IPv4 to IPv6 via a dropdown menu 605, and can change the list of targets by loading the proper file in the box field 606.

Various Embodiments of Hop Reduction Methods

FIGS. 10-18 show several example methods to obtain a list of candidate ASes to be connected along paths defined between given ASes and target ASes in order to reduce an average number of hops made by packets traveling along the paths, selected to collectively show every aspect of the claimed methods and systems in an appropriate context. It should be noted that the examples presented herein are not limiting, and that other example methods, of obtaining a list of candidate ASes to be connected along paths defined between given ASes and target ASes in order to reduce an average number of hops made by packets traveling along the paths, may be realized through different combinations of the various elements shown in FIGS. 10-18 and described herein.

Figure 10:
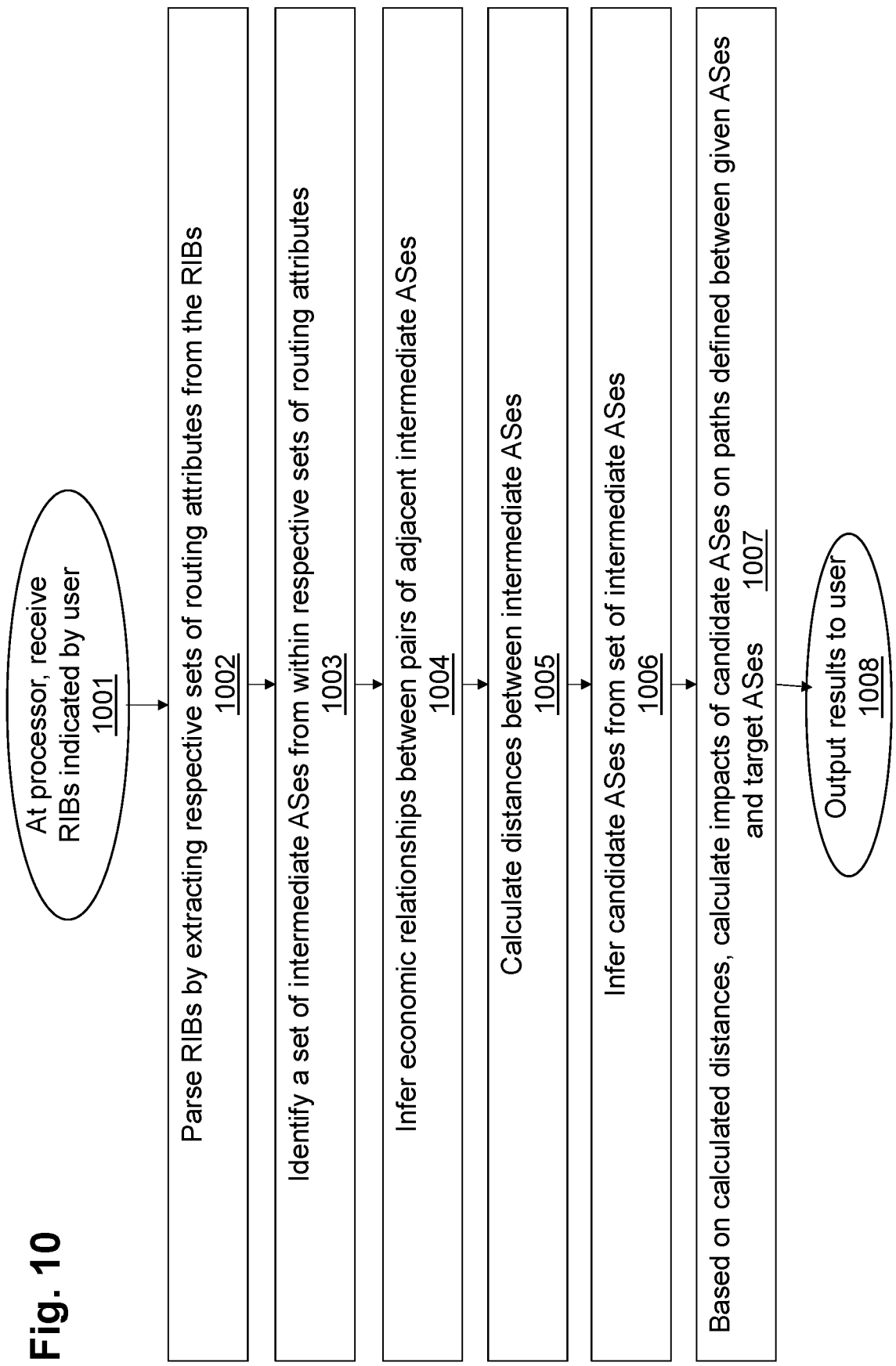
FIGS. 10-18 illustrate a series of flow charts of various embodiments of a method to obtain a list of candidate ASes to be connected along paths defined between given ASes and target ASes in order to reduce an average number of hops made by packets traveling along the paths.

FIG. 10 depicts an embodiment of a method to obtain a list of candidate ASes to be connected along paths defined between given ASes and target ASes in order to reduce an average number of hops made by packets traveling along the paths. According to the embodiment, a processor may be configured to receive 1001 RIBs indicated by a user. The processor may be further configured to parse 1002 RIBs by extracting respective sets of routing attributes from the RIBs. The processor may be further configured to identify 1003 a set of intermediate ASes from within respective sets of routing attributes. The processor may be further configured to infer economic relationships 1004 between pairs of adjacent intermediate ASes. The processor may be further configured to calculate distances 1005 between intermediate ASes. The processor may be further configured to infer candidate ASes 1006 from the set of intermediate ASes. The processor may be further configured to calculate, based on calculated distances, impacts 1007 of candidate ASes on paths defined between given ASes and target ASes. The processor may be further configured to output 1008 results, including the calculated impacts, to the user to identify candidate ASes to connect along the paths to reduce an average number of hops along the paths, thereby increasing routing efficiency between the given ASes and the target ASes.

Figure 11:
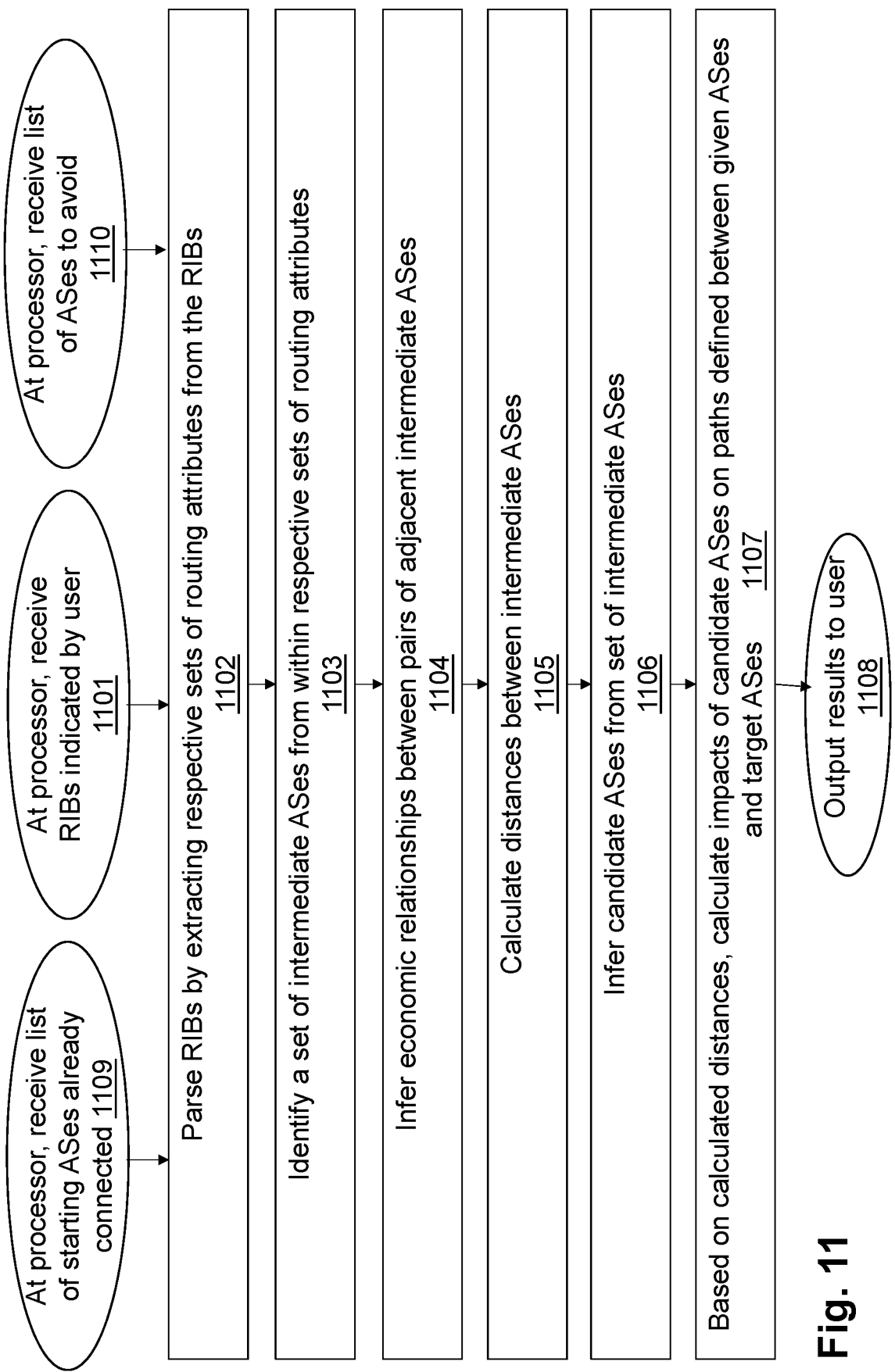

FIG. 11 depicts an embodiment of a method to obtain a list of candidate ASes to be connected along paths defined between given ASes and target ASes in order to reduce an average number of hops made by packets traveling along the paths. According to the embodiment, a processor may be configured to receive RIBs 1101 indicated by a user. The processor may be further configured to receive a list of starting ASes already connected 1109, and a list of ASes to avoid 1110. The processor may be further configured to parse 1102 RIBs by extracting respective sets of routing attributes from the RIBs. The processor may be further configured to identify 1103 a set of intermediate ASes from within respective sets of routing attributes. The processor may be further configured to infer economic relationships 1104 between pairs of adjacent intermediate ASes. The processor may be further configured to calculate distances 1105 between intermediate ASes. The processor may be further configured to infer candidate ASes 1106 from the set of intermediate ASes. The processor may be further configured to calculate, based on calculated distances, impacts 1107 of candidate ASes on paths defined between given ASes and target ASes. The processor may be further configured to output 1108 results, including the calculated impacts, to the user to identify candidate ASes to connect along the paths to reduce an average number of hops along the paths, thereby increasing routing efficiency between the given ASes and the target ASes.

Figure 12:
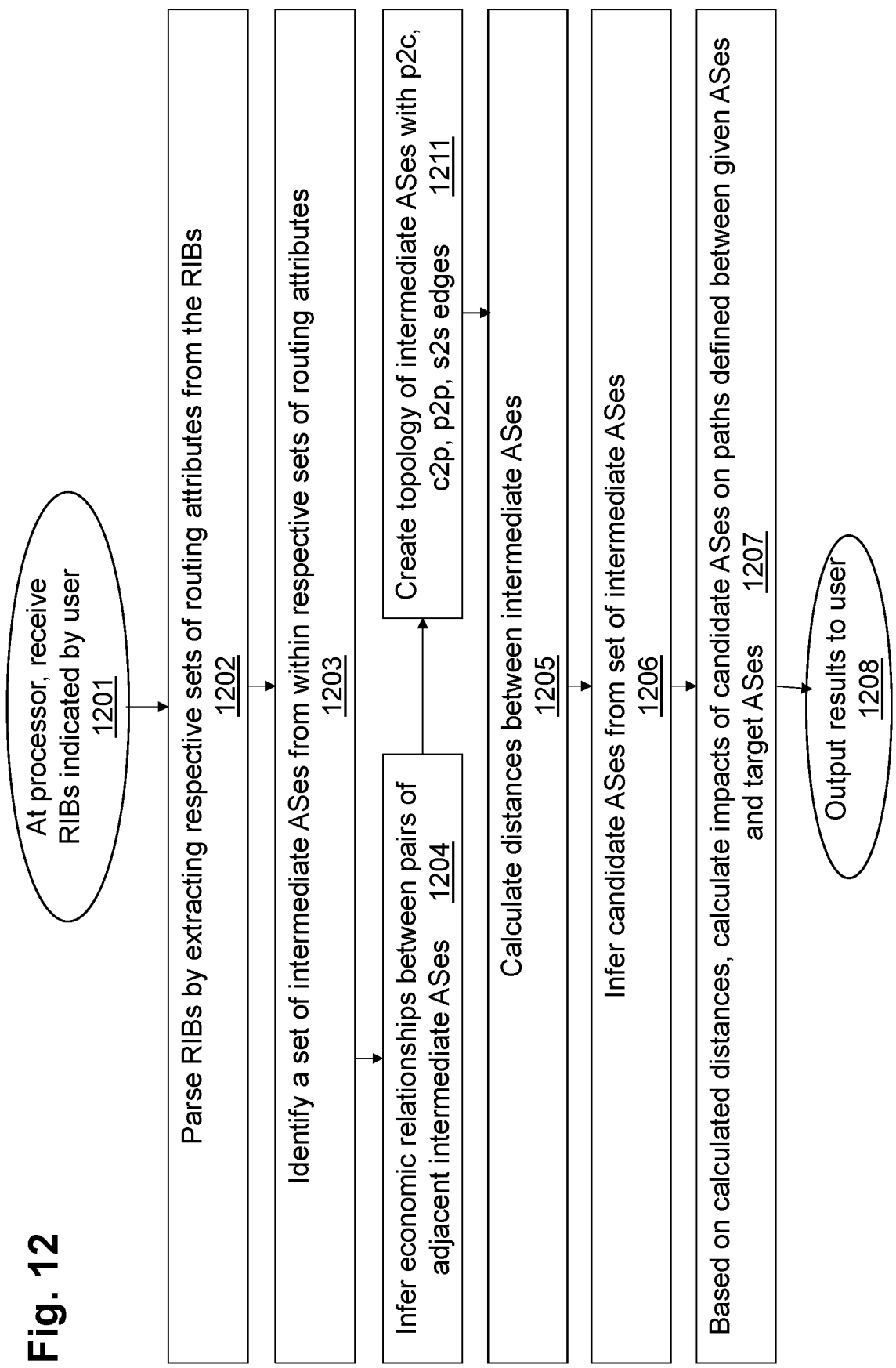

FIG. 12 depicts an embodiment of a method to obtain a list of candidate ASes to be connected along paths defined between given ASes and target ASes in order to reduce an average number of hops made by packets traveling along the paths. According to the embodiment, a processor may be configured to receive 1201 RIBs indicated by a user. The processor may be further configured to parse 1202 RIBs by extracting respective sets of routing attributes from the RIBs. The processor may be further configured to identify 1203 a set of intermediate ASes from within respective sets of routing attributes. The processor may be further configured to infer economic relationships 1204 between pairs of adjacent intermediate ASes. The processor may be further configured to create a topology 1211 of intermediate ASes with p2c, c2p, p2p, and/or s2s edges. The processor may be further configured to calculate distances 1205 between intermediate ASes. The processor may be further configured to infer candidate ASes 1206 from the set of intermediate ASes. The processor may be further configured to calculate, based on calculated distances, impacts 1207 of candidate ASes on paths defined between given ASes and target ASes. The processor may be further configured to output 1208 results, including the calculated impacts, to the user to identify candidate ASes to connect along the paths to reduce an average number of hops along the paths, thereby increasing routing efficiency between the given ASes and the target ASes.

Figure 13:
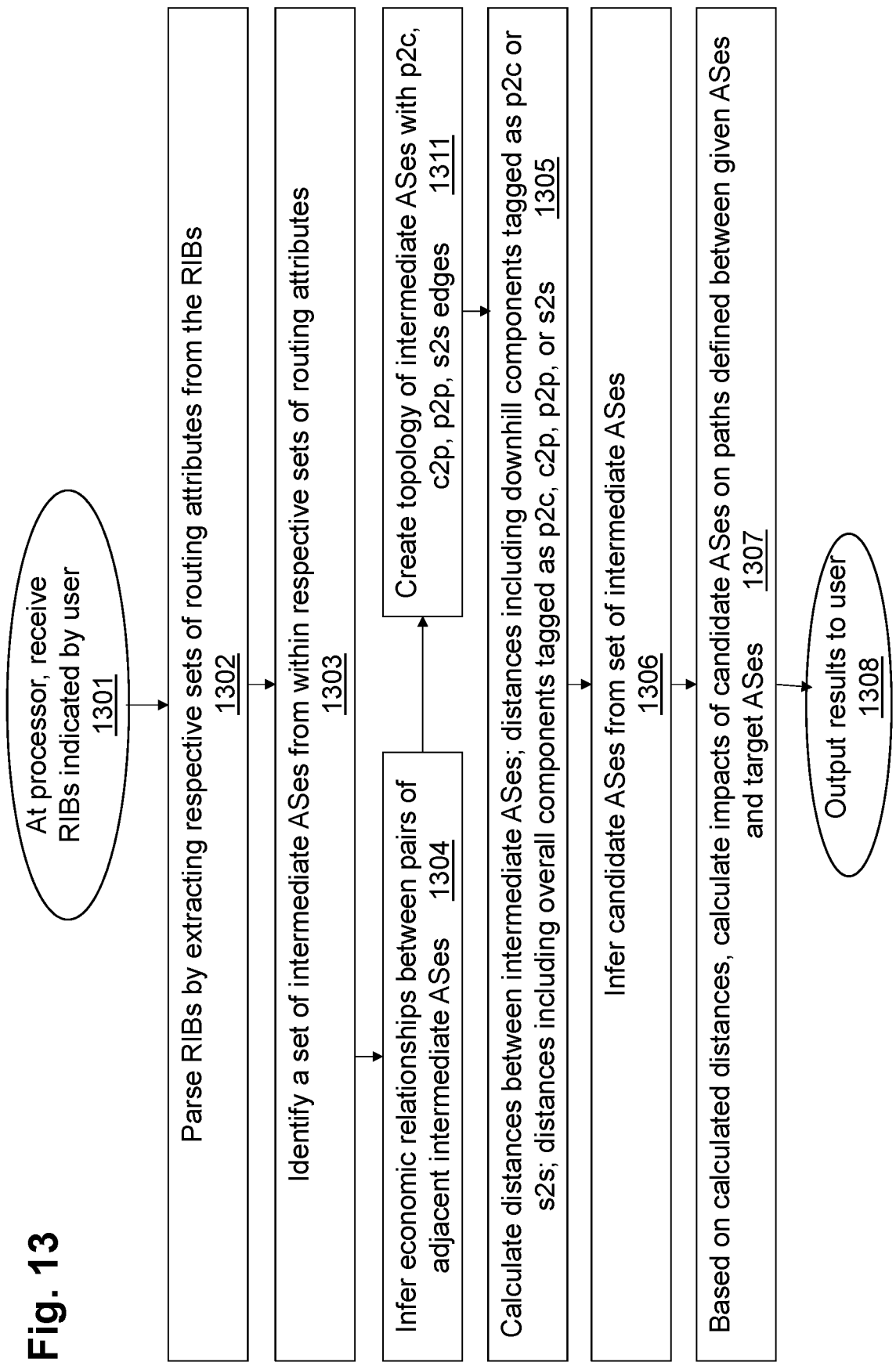

FIG. 13 depicts an embodiment of a method to obtain a list of candidate ASes to be connected along paths defined between given ASes and target ASes in order to reduce an average number of hops made by packets traveling along the paths. According to the embodiment, a processor may be configured to receive 1301 RIBs indicated by a user. The processor may be further configured to parse 1302 RIBs by extracting respective sets of routing attributes from the RIBs. The processor may be further configured to identify 1303 a set of intermediate ASes from within respective sets of routing attributes. The processor may be further configured to infer economic relationships 1304 between pairs of adjacent intermediate ASes. The processor may be further configured to create a topology 1311 of intermediate ASes with p2c, c2p, p2p, and/or s2s edges. The processor may be further configured to calculate distances 1305 between intermediate ASes, wherein the distances include downhill components tagged as p2c or s2s, and the distances further include overall components tagged as p2c, c2p, p2p, or s2s. The processor may be further configured to infer candidate ASes 1306 from the set of intermediate ASes. The processor may be further configured to calculate, based on calculated distances, impacts 1307 of candidate ASes on paths defined between given ASes and target ASes. The processor may be further configured to output 1308 results, including the calculated impacts, to the user to identify candidate ASes to connect along the paths to reduce an average number of hops along the paths, thereby increasing routing efficiency between the given ASes and the target ASes.

Figure 14:
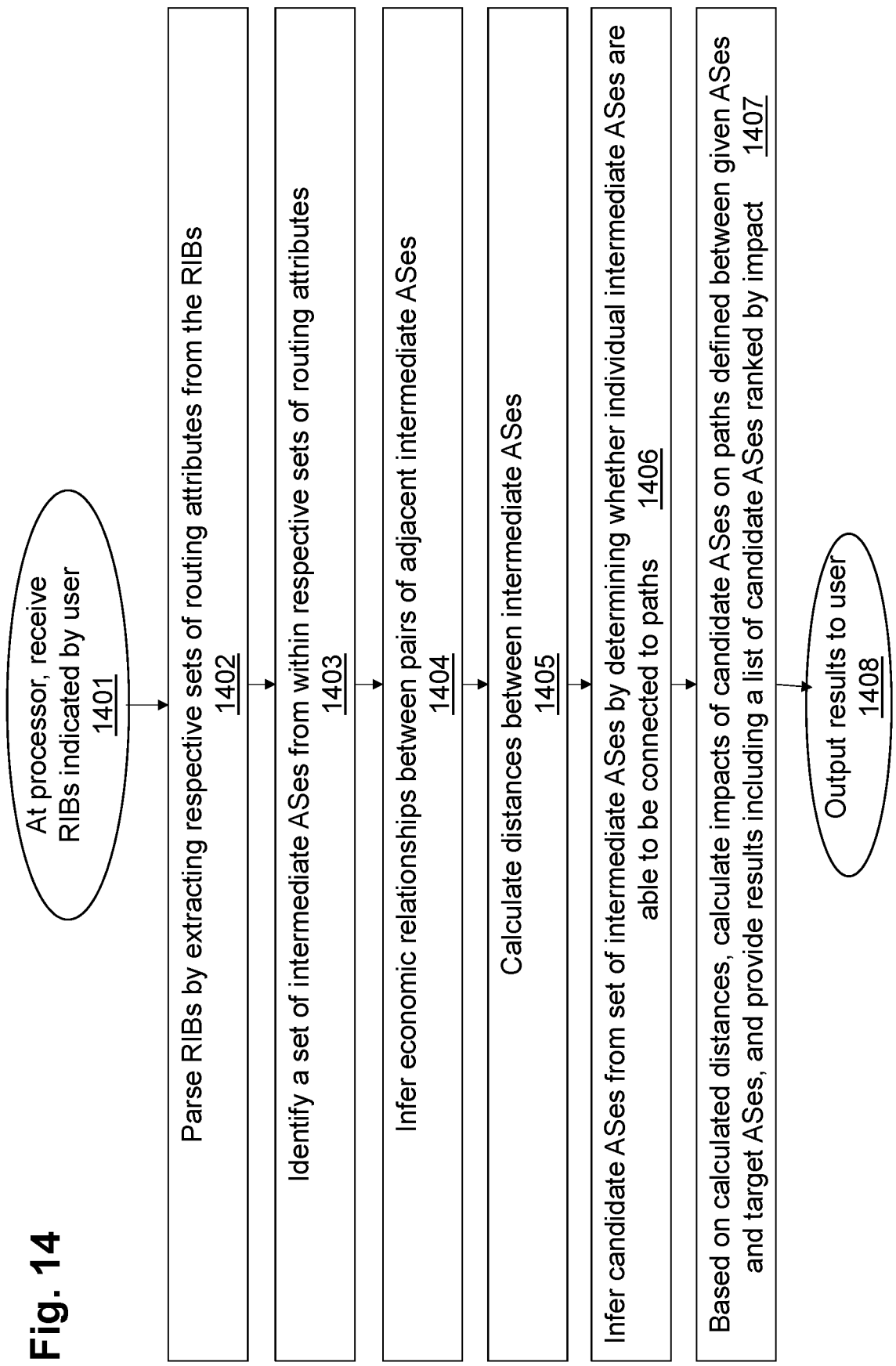

FIG. 14 depicts an embodiment of a method to obtain a list of candidate ASes to be connected along paths defined between given ASes and target ASes in order to reduce an average number of hops made by packets traveling along the paths. According to the embodiment, a processor may be configured to receive 1401 RIBs indicated by a user. The processor may be further configured to parse 1402 RIBs by extracting respective sets of routing attributes from the RIBs. The processor may be further configured to identify 1403 a set of intermediate ASes from within respective sets of routing attributes. The processor may be further configured to infer economic relationships 1404 between pairs of adjacent intermediate ASes. The processor may be further configured to calculate distances 1405 between intermediate ASes. The processor may be further configured to infer candidate ASes 1406 from the set of intermediate ASes by determining whether individual intermediate ASes are able to be connected to the paths. The processor may be further configured to calculate, based on calculated distances, impacts 1407 of candidate ASes on paths defined between given ASes and target ASes, and provide results including a list of candidate ASes ranked by impact. The processor may be further configured to output 1408 results, including the calculated impacts, to the user to identify candidate ASes to connect along the paths to reduce an average number of hops along the paths, thereby increasing routing efficiency between the given ASes and the target ASes.

Figure 15:
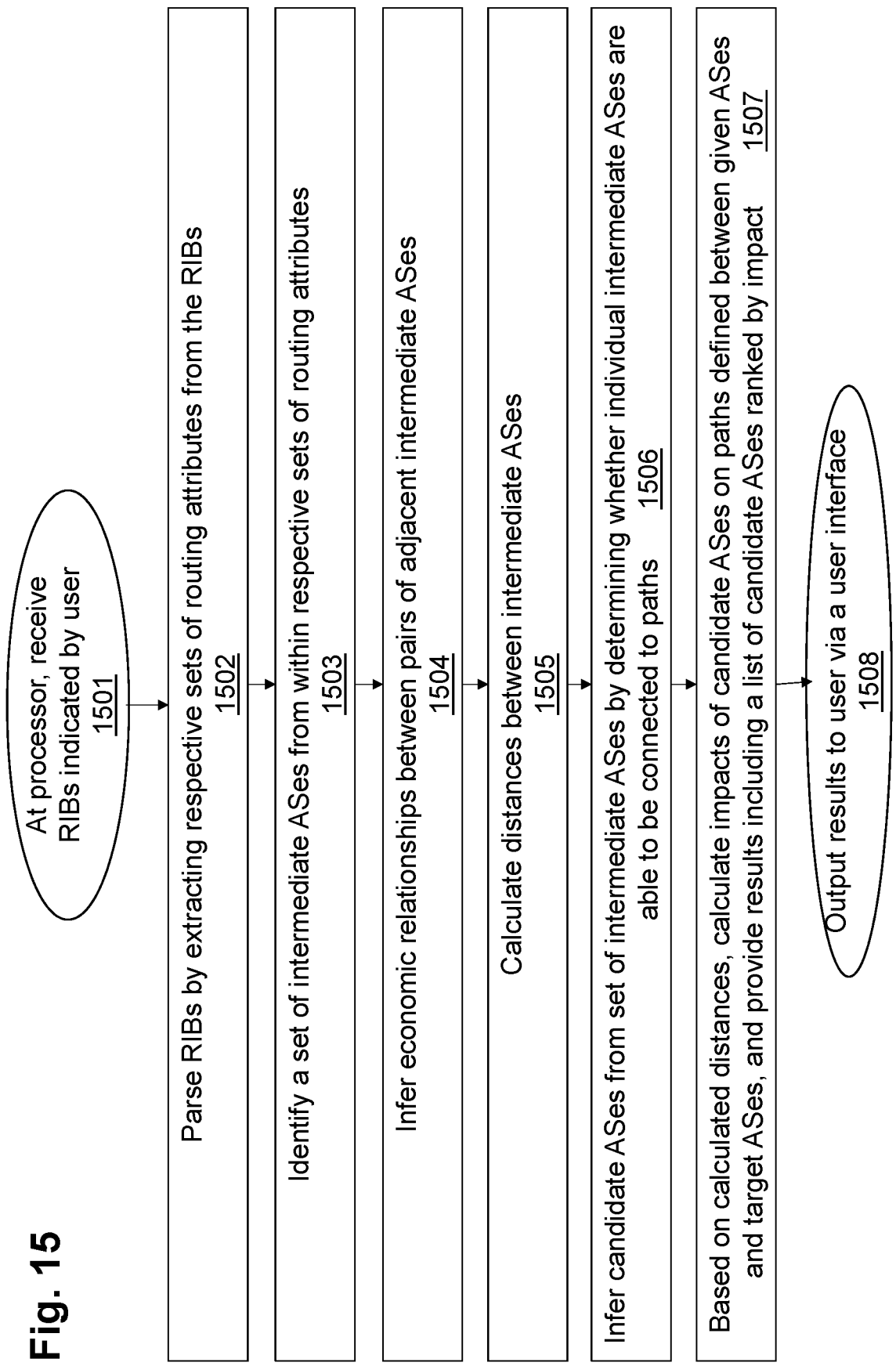

FIG. 15 depicts an embodiment of a method to obtain a list of candidate ASes to be connected along paths defined between given ASes and target ASes in order to reduce an average number of hops made by packets traveling along the paths. According to the embodiment, a processor may be configured to receive 1501 RIBs indicated by a user. The processor may be further configured to parse 1502 RIBs by extracting respective sets of routing attributes from the RIBs. The processor may be further configured to identify 1503 a set of intermediate ASes from within respective sets of routing attributes. The processor may be further configured to infer economic relationships 1504 between pairs of adjacent intermediate ASes. The processor may be further configured to calculate distances 1505 between intermediate ASes. The processor may be further configured to infer candidate ASes 1506 from the set of intermediate ASes by determining whether individual intermediate ASes are able to be connected to the paths. The processor may be further configured to calculate, based on calculated distances, impacts 1507 of candidate ASes on paths defined between given ASes and target ASes, and provide results including a list of candidate ASes ranked by impact. The processor may be further configured to output 1508 results, including the calculated impacts, to the user via a user interface to identify candidate ASes to connect along the paths to reduce an average number of hops along the paths, thereby increasing routing efficiency between the given ASes and the target ASes.

Figure 16:
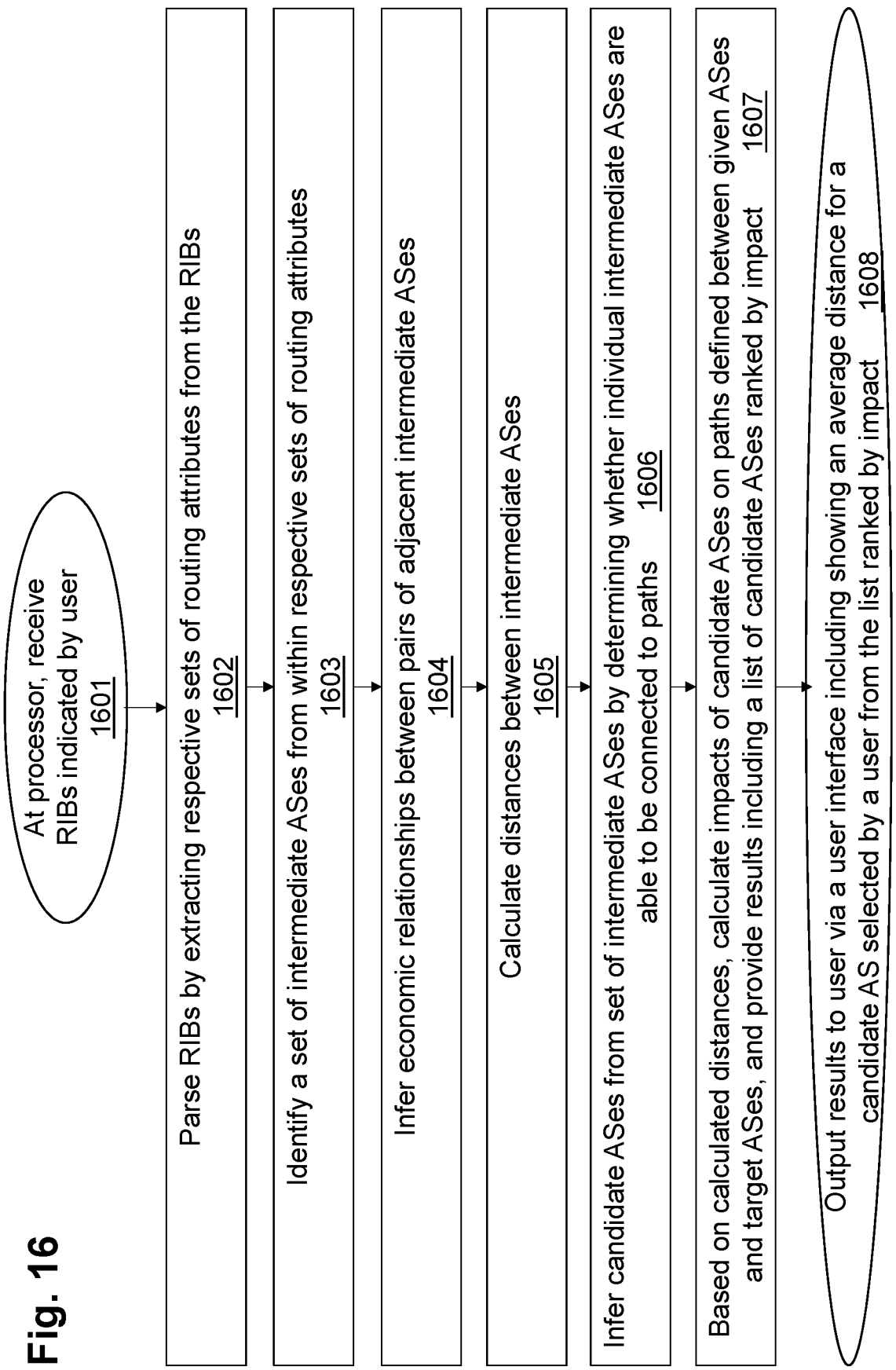

FIG. 16 depicts an embodiment of a method to obtain a list of candidate ASes to be connected along paths defined between given ASes and target ASes in order to reduce an average number of hops made by packets traveling along the paths. According to the embodiment, a processor may be configured to receive 1601 RIBs indicated by a user. The processor may be further configured to parse 1602 RIBs by extracting respective sets of routing attributes from the RIBs. The processor may be further configured to identify 1603 a set of intermediate ASes from within respective sets of routing attributes. The processor may be further configured to infer economic relationships 1604 between pairs of adjacent intermediate ASes. The processor may be further configured to calculate distances 1605 between intermediate ASes. The processor may be further configured to infer candidate ASes 1606 from the set of intermediate ASes by determining whether individual intermediate ASes are able to be connected to the paths. The processor may be further configured to calculate, based on calculated distances, impacts 1607 of candidate ASes on paths defined between given ASes and target ASes, and provide results including a list of candidate ASes ranked by impact. The processor may be further configured to output 1608 results, including the calculated impacts, to the user via a user interface, including showing an average distance for a candidate AS selected by a user from the list ranked by impact, to identify candidate ASes to connect along the paths to reduce an average number of hops along the paths, thereby increasing routing efficiency between the given ASes and the target ASes.

Figure 17:
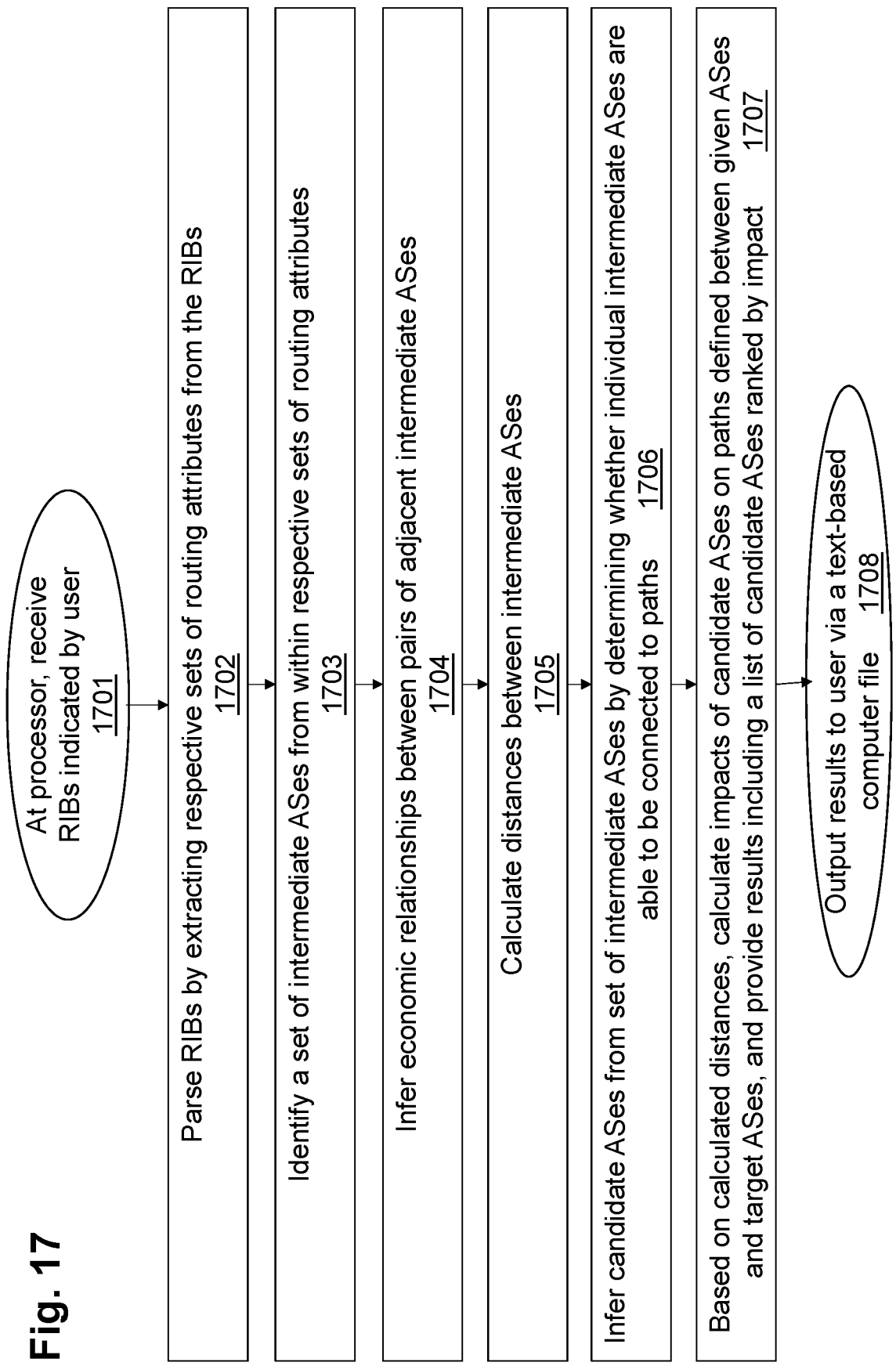

FIG. 17 depicts an embodiment of a method to obtain a list of candidate ASes to be connected along paths defined between given ASes and target ASes in order to reduce an average number of hops made by packets traveling along the paths. According to the embodiment, a processor may be configured to receive 1701 RIBs indicated by a user. The processor may be further configured to parse 1702 RIBs by extracting respective sets of routing attributes from the RIBs. The processor may be further configured to identify 1703 a set of intermediate ASes from within respective sets of routing attributes. The processor may be further configured to infer economic relationships 1704 between pairs of adjacent intermediate ASes. The processor may be further configured to calculate distances 1705 between intermediate ASes. The processor may be further configured to infer candidate ASes 1706 from the set of intermediate ASes by determining whether individual intermediate ASes are able to be connected to the paths. The processor may be further configured to calculate, based on calculated distances, impacts 1707 of candidate ASes on paths defined between given ASes and target ASes, and provide results including a list of candidate ASes ranked by impact. The processor may be further configured to output 1708 results, including the calculated impacts, to the user in a form of a text-based computer file, to identify candidate ASes to connect along the paths to reduce an average number of hops along the paths, thereby increasing routing efficiency between the given ASes and the target ASes.

Figure 18:
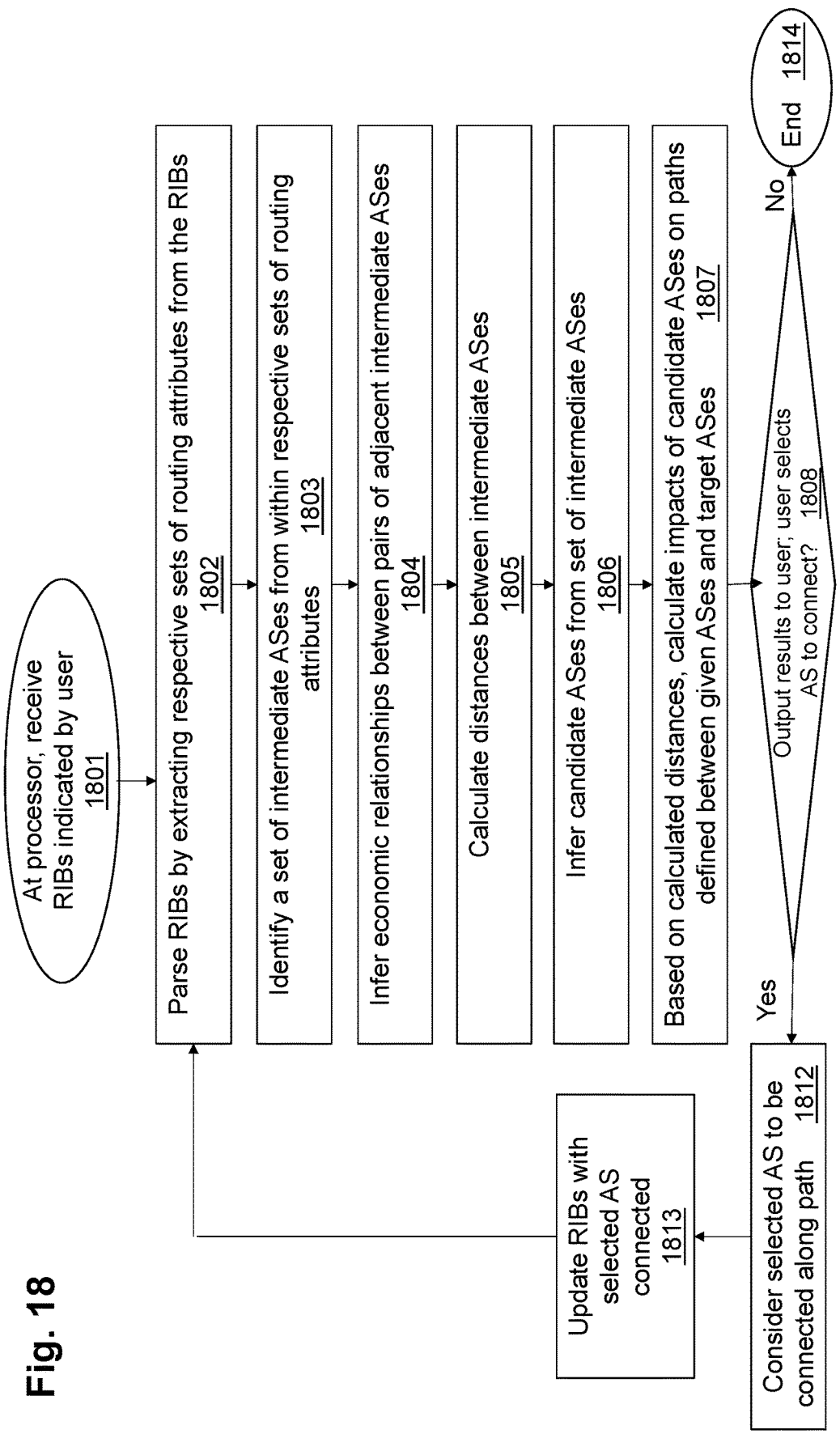

FIG. 18 depicts an embodiment of a method to obtain a list of candidate ASes to be connected along paths defined between given ASes and target ASes in order to reduce an average number of hops made by packets traveling along the paths. According to the embodiment, a processor may be configured to receive 1801 RIBs indicated by a user. The processor may be further configured to parse 1802 RIBs by extracting respective sets of routing attributes from the RIBs. The processor may be further configured to identify 1803 a set of intermediate ASes from within respective sets of routing attributes. The processor may be further configured to infer economic relationships 1804 between pairs of adjacent intermediate ASes. The processor may be further configured to calculate distances 1805 between intermediate ASes. The processor may be further configured to infer candidate ASes 1806 from the set of intermediate ASes. The processor may be further configured to calculate, based on calculated distances, impacts 1807 of candidate ASes on paths defined between given ASes and target ASes. The processor may be further configured to output 1808 results, including the calculated impacts, to the user to identify candidate ASes to connect along the paths to reduce an average number of hops along the paths, thereby increasing routing efficiency between the given ASes and the target ASes, and further determine whether a user has selected an AS to connect. If the user has selected an AS to connect, the processor may be further configured to consider 1812 the selected AS to be connected along a path. The processor may be further configured to update 1813 the RIBs with the selected AS considered to be connected. The processor may be further configured to repeat the tasks of parsing 1802 RIBs, identifying intermediate ASes 1803, inferring economic relationships 1804, calculating distances 1805, inferring candidate ASes 1806, calculating impacts 1807, outputting 1808 results and determining whether a user has selected another AS to connect, considering 1812 the newly selected AS to be connected along a path, and updating 1813 the RIBs with the newly selected AS considered to be connected along a path. The processor may repeat the aforementioned tasks multiple times, for example, two times, three times, four times, five times, ten times, or twenty times. The processor may pause or end 1814 repetition of the aforementioned tasks if it is determined that a user has not selected another AS to connect along a path.

Digital Processing Environment

Figure 7:
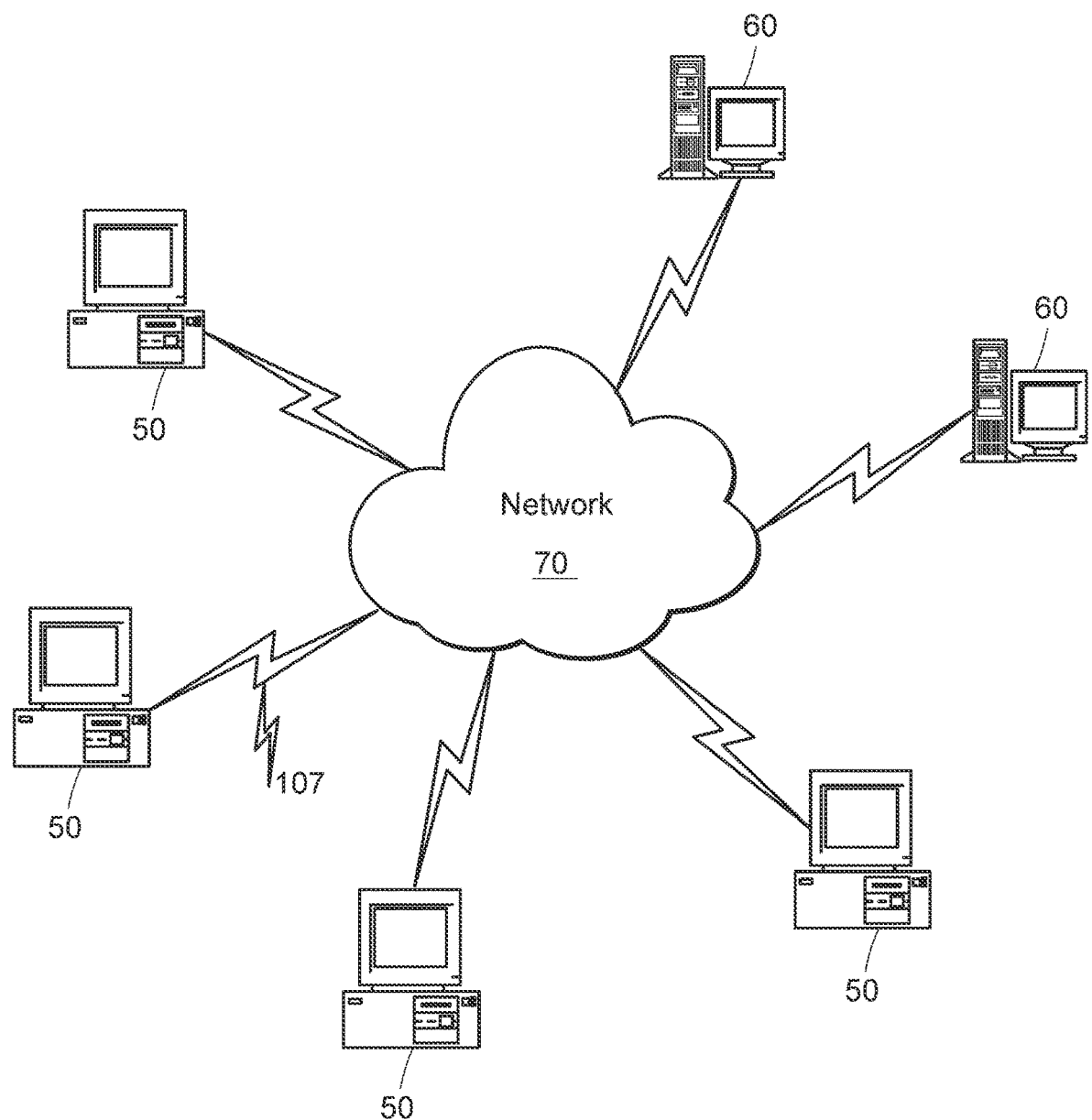
FIG. 7 is a schematic diagram of a computer network environment in which embodiments may be deployed.

Example implementations of the disclosed methods and systems may be implemented in a software, firmware, or hardware environment. FIG. 7 illustrates one such environment. For example, the method/system described above (including in FIGS. 1-6) may be implemented in the environment of FIG. 7. Client computer(s)/devices 50 (e.g., mobile phones or computing devices) and a cloud 60 (or server computer or cluster thereof) provide processing, storage, and input/output devices executing application programs and the like.

Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic devices/computer network architectures are suitable.

Figure 8:
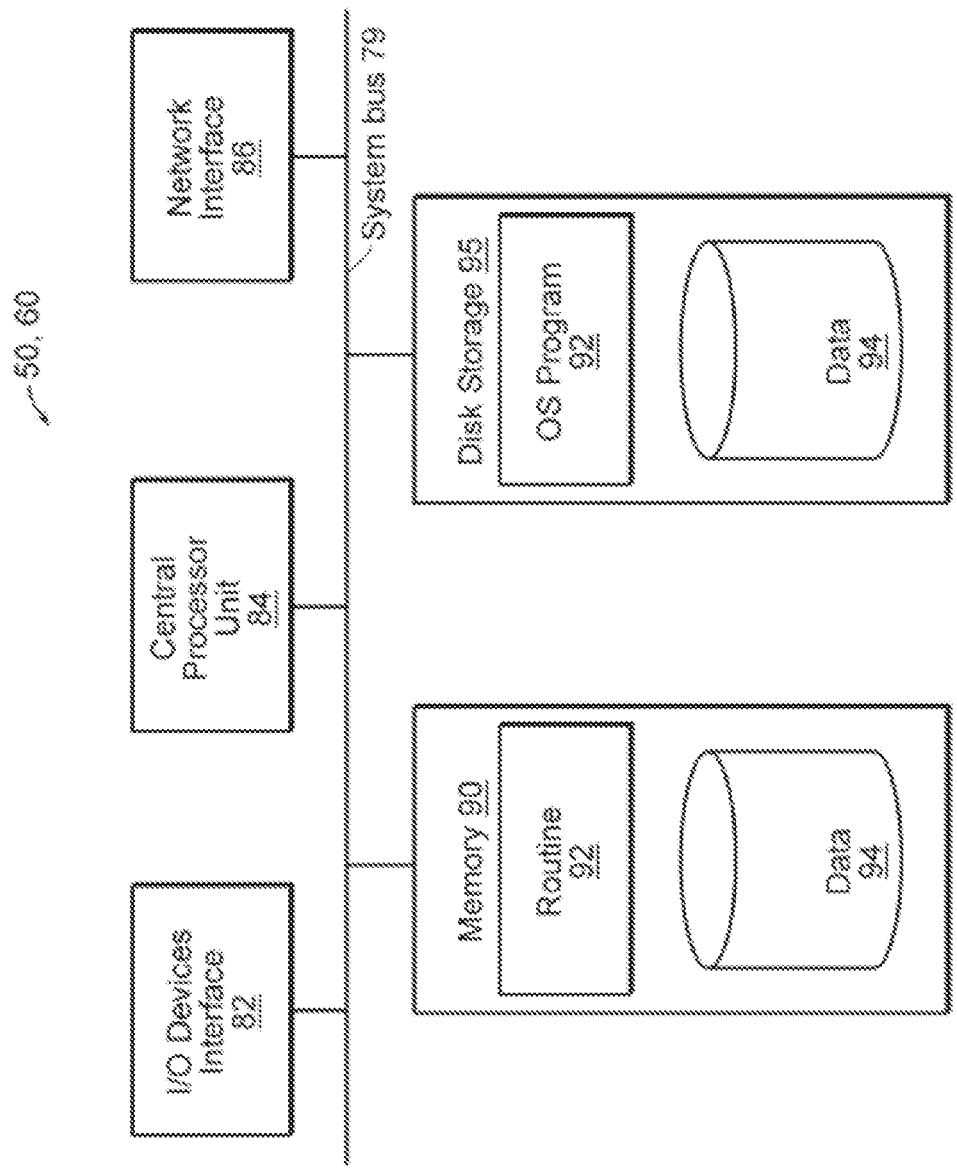
FIG. 8 is a block diagram of the computer nodes in the network of FIG. 7.

Embodiments of the disclosed methods and systems may include means for identifying, parsing monitoring, tracking, modeling, filtering, tuning, scaling, decoding, processing or scanning for routing data, such as a set of potential candidate provider and/or peer ASes and their potential impact on paths defined between given ASes and target ASes if connected along the paths. FIG. 8 is a diagram of the internal structure of a computer/computing node (e.g., client processor/device/mobile phone device/tablet 50 or server computers 60) in the processing environment of FIG. 7. For example, method/system described above (including in FIGS. 1-6) may be implemented by the computer/computing node of FIG. 8.

Each computer 50, 60 contains a system bus 79, where a bus is a set of actual or virtual hardware lines used for data transfer among the components of a computer or processing system. Bus 79 is essentially a shared conduit that connects different elements of a computer system (e.g., processor, packet analyzer, network interface disk storage, memory, input/output ports, etc.) that enables the transfer of data between the elements. Attached to the system bus 79 is an I/O device interface 82 for connecting various input and output devices (e.g., keyboard, mouse, displays, printers, speakers, etc.) to the computer 50, 60. Network interface 86 allows the computer to connect to various other devices attached to a network (for example, the network illustrated at 70 of FIG. 7). Memory 90 provides volatile storage for computer software instructions 92 and data 94 used to implement a software implementation of the disclosed methods and systems.

Disk storage 95 provides non-volatile storage for computer software instructions 98 (equivalently "OS program") and data 94 used to implement an embodiment of the disclosed methods and systems. Central processor unit 84 is also attached to system bus 79 and provides for the execution of computer instructions. Note that throughout the present text, "computer software instructions" and "OS program" are equivalent.

In one example, a system may be configured with computer readable instructions 92 that implement a method and/or system designed to identify a set of potential candidate provider and/or peer ASes and their potential impact on paths defined between given ASes and target ASes if connected along the paths.

The computer program product 92 can be installed by any suitable software installation procedure, as is well known in the art. In another embodiment, at least a portion of the software instructions may also be downloaded over a cable, communication, and/or wireless connection. In other embodiments, the software is a computer program propagated signal product embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for the computer program propagated signal product.

The teachings of all patents, published applications and references cited herein or included in the appendix are incorporated by reference in their entirety including:

[Leiner et al.] Leiner, Barry M., Vinton G. Cerf, David D. Clark, Robert E. Kahn, Leonard Kleinrock, Daniel C. Lynch, Jon Postel, Larry G. Roberts, and Stephen Wolff. "*A brief history of the Internet*," ACM SIGCOMM Computer Communication Review, vol. 39, no. 5, pp. 22-31, 2009.

[Gao] Lixin Gao, "*On Inferring Autonomous System Relationships in the Internet*," IEEE/ACM Transactions on Networking (TON), vol. 9, no. 6, pp. 733-738, 2001.

[Gregori et al.] Enrico Gregori, Alessandro Improta, Luciano Lenzini, Lorenzo Rossi, and Luca Sani. "*A novel methodology to address the Internet AS-level data incompleteness*," IEEE/ACM Transactions on Networking (TON) vol. 23, no. 4, pp. 1314-1327, 2015.

[Di Battista et al.] Giuseppe Di Battista, Thomas Erlebach, Alexander Hall, Maurizio Patrignani, Maurizio Pizzonia, and Thomas Schank. "*Computing the Types of the Relationships Between Autonomous Systems*," IEEE/ACM Transactions on Networking (TON) vol. 15, no. 2, pp. 267-280, 2007.

[Dimitropoulos et al.] Xenofontas Dimitropoulos, Dmitri Krioukov, Bradley Huffaker, kc Claffy, and George Riley. "*Inferring AS Relationships: Dead End or Lively Beginning?*," Proceedings of the 4th International Conference on Experimental and Efficient Algorithms (WEA '05), pp. 113-125, 2005.

While example embodiments have been particularly shown and described, it will be understood by those skilled in the art that various changes in form and details may be made therein without departing from the scope of the embodiments encompassed by the appended claims.

What is claimed is:

1. A computer-implemented method of increasing routing efficiency between one or more given autonomous systems (ASes) and one or more target ASes in a border gateway protocol (BGP) session, the method comprising:
   receiving, at a processor, one or more routing attributes included in one or more Routing Information Bases (RIBs); and
   configuring the processor to:
      identify one or more intermediate ASes from within the one or more routing attributes;
      calculate distances between each of the one or more intermediate ASes;
      generate an M×M matrix of the calculated distances, M being a number of ASes found in at least one of the one or more RIBs;
      infer one or more candidate ASes from the one or more intermediate ASes using the matrix of the calculated distances;
      for each respective AS described in the matrix of the calculated distances, compute a list of potential saved hops to reach each of the one or more target ASes if the respective AS were connected along one or more paths defined between the one or more given ASes and the one or more target ASes; and
      identify at least one of the one or more candidate ASes having higher values of impact to connect along the one or more paths to reduce an average number of hops along the one or more paths, thereby increasing routing efficiency between the one or more given ASes and the one or more target ASes.

2. The method of claim 1 further including receiving, at the processor, a list of one or more starting ASes that are already connected to the one or more paths and a list of one or more ASes to avoid.

3. The method of claim 2 wherein the one or more given ASes are the one or more starting ASes.

4. The method of claim 1 further including configuring the processor to create a topology of the one or more intermediate ASes, the topology having edges defined between the one or more intermediate ASes, the edges representing economic relationships between intermediate ASes, wherein the economic relationships include at least one of customer-provider (c2p or p2c), peer-to-peer (p2p), or sibling-to-sibling (s2s), the edges tagged as p2c, c2p, p2p, or s2s.

5. The method of claim 4 wherein the calculated distances include components of downhill distances calculated for edges tagged as p2c or s2s, and components of overall distances calculated for edges tagged as p2c, c2p, p2p, or s2s.

6. The method of claim 1 wherein the one or more candidate ASes are inferred from the one or more intermediate ASes by determining whether or not individual intermediate ASes are able to be connected to the one or more paths, and wherein impacts of the one or more candidate ASes on the one or more paths are provided for a list of candidate ASes ranked by impact.

7. The method of claim 1 further including, prior to the configuring:
   receiving, at the processor, a selection of at least one candidate AS to connect along at least one path; and
   modifying, via the processor, the one or more routing attributes to reflect that the at least one candidate AS is connected along the at least one path.

8. A system for increasing routing efficiency between one or more given autonomous systems (ASes) and one or more target ASes in a border gateway protocol (BGP) session, the system comprising:
   a processor and a non-transitory memory device having processor instructions stored thereon, the instructions, when loaded, configuring the processor to:
      receive one or more routing attributes included in one or more Routing Information Bases (RIBs);
      identify one or more intermediate ASes from within the one or more routing attributes;
      execute a distance calculator configured to calculate distances between each of the one or more intermediate ASes;
      generate an M×M matrix of the calculated distances, M being a number of ASes found in at least one of the one or more RIBs;
      execute a gain analyzer configured to infer one or more candidate ASes from the one or more intermediate ASes using the matrix of the calculated distances;
      for each respective AS described in the matrix of the calculated distances, compute a list of potential saved hops to reach each of the one or more target ASes if the respective AS were connected along one or more paths defined between the one or more given ASes and the one or more target ASes; and
      identify at least one of the one or more candidate ASes having higher values of impact to connect along the one or more paths to reduce an average number of hops along the one or more paths, thereby increasing routing efficiency between the one or more given ASes and the one or more target ASes.

9. The system of claim 8 wherein the processor is further configured to receive a list of one or more starting ASes that are already connected to the one or more paths and a list of one or more ASes to avoid.

10. The system of claim 9 wherein the one or more given ASes are the one or more starting ASes.

11. The system of claim 8 wherein the processor is further configured to create a topology of the one or more intermediate ASes, the topology having edges defined between the one or more intermediate ASes, the edges representing economic relationships between intermediate ASes, wherein the economic relationships include at least one of customer-provider (c2p or p2c), peer-to-peer (p2p), or sibling-to-sibling (s2s), the edges tagged as p2c, c2p, p2p, or s2s.

12. The system of claim 11 wherein the calculated distances include components of downhill distances calculated for edges tagged as p2c or s2s, and components of overall distances calculated for edges tagged as p2c, c2p, p2p, or s2s.

13. The system of claim 8 wherein the one or more candidate ASes are inferred from the one or more intermediate ASes by determining whether or not individual intermediate ASes are able to be connected to the one or more paths, and wherein impacts of the one or more candidate ASes on the one or more paths are provided for a list of candidate ASes ranked by impact.

14. The system of claim 8 wherein the processor is further configured to:
receive a selection of at least one candidate AS to connect along at least one path; and
modify the one or more routing attributes to reflect that the at least one candidate AS is connected along the at least one path.

15. The method of claim 2 wherein computing the list of potential saved hops excludes connecting the one or more ASes to avoid.

16. The method of claim 1 wherein inferring the one or more candidate ASes from the one or more intermediate ASes comprises determining whether each of the one or more intermediate ASes is able to be connected to one or more of the one or more paths.

17. The method of claim 1 further including:
configuring the processor to infer economic relationships between pairs of adjacent intermediate ASes;
wherein calculating the distances between each of the one or more intermediate ASes is based on the inferred economic relationships.

18. The system of claim 9 wherein computing the list of potential saved hops excludes connecting the one or more ASes to avoid.

19. The system of claim 8 wherein the processor is further configured to infer the one or more candidate ASes from the one or more intermediate ASes by determining whether each of the one or more intermediate ASes is able to be connected to one or more of the one or more paths.

20. The system of claim 8 wherein the processor is further configured to:
infer economic relationships between pairs of adjacent intermediate ASes; and
calculate the distances between each of the one or more intermediate ASes based on the inferred economic relationships.

* * * * *